US011659582B2

(12) United States Patent
Baek et al.

(10) Patent No.: US 11,659,582 B2
(45) Date of Patent: May 23, 2023

(54) METHOD AND APPARATUS FOR 5G MIGRATION IN FREQUENCY INTERFERENCE COMBINATION BAND

(71) Applicant: Samsung Electronics Co., Ltd., Suwon-si (KR)

(72) Inventors: Jooyoung Baek, Suwon-si (KR); Byoungyoon Min, Suwon-si (KR); Hyoyol Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 21 days.

(21) Appl. No.: 16/876,557

(22) Filed: May 18, 2020

(65) Prior Publication Data

US 2020/0367258 A1    Nov. 19, 2020

Related U.S. Application Data

(60) Provisional application No. 62/848,691, filed on May 16, 2019.

(51) Int. Cl.
*H04W 4/00* (2018.01)
*H04W 72/541* (2023.01)
*H04W 72/0453* (2023.01)

(52) U.S. Cl.
CPC ..... *H04W 72/541* (2023.01); *H04W 72/0453* (2013.01)

(58) Field of Classification Search
CPC ........... H04W 72/0453; H04W 72/082; H04W 72/0446; H04W 72/085; H04W 76/16;
(Continued)

(56) References Cited

U.S. PATENT DOCUMENTS 9,577,801 B2    2/2017  Ji et al.
10,080,199 B2   9/2018  Chae et al.
(Continued)

FOREIGN PATENT DOCUMENTS

WO    2018-226065 A1    12/2018

OTHER PUBLICATIONS

Huawei, Discussion on LTE-NR uplink sharing from UE perspective, 3GPP TSG RAN meeting #79, RP-180501, Mar. 19-22, 2018, Chennai, India.
(Continued)

*Primary Examiner* — Thai D Hoang
(74) *Attorney, Agent, or Firm* — Jefferson IP Law, LLP

(57) ABSTRACT

The disclosure relates to a communication technique for combining a $5^{th}$ generation (5G) communication system with an IoT technology to support a higher data transmission rate than a $4^{th}$ generation (4G) system, and a system thereof. The disclosure may be applied to intelligent services (for example, services related to smart homes, smart buildings, smart cities, smart cars or connected cars, health care, digital education, retail business, security and safety, etc.) based on a 5G communication technology and an IoT-related technology. A method and an apparatus for 5G migration in a frequency interference combination band and, more specifically, to a scheduling method and apparatus for interference control and efficient resource utilization in a mobile communication system supporting a carrier aggregation technology, a dual connectivity or multi-connectivity technology, or the like which simultaneously uses a plurality of frequency resources are provided.

16 Claims, 20 Drawing Sheets

(58) Field of Classification Search
CPC . H04W 88/06; H04W 72/1215; H04W 76/15; H04L 5/0094; H04L 5/0091; H04L 5/001; H04L 5/0073; H04L 5/1469; H04J 11/0023
USPC .................................. 370/329–330, 335–345
See application file for complete search history.

(56) References Cited

U.S. PATENT DOCUMENTS

| | | | | |
|---|---|---|---|---|
| 11,133,839 | B2* | 9/2021 | Zeng | H04B 17/309 |
| 2013/0337795 | A1* | 12/2013 | Falconetti | H04W 72/04 |
| | | | | 455/419 |
| 2014/0003363 | A1* | 1/2014 | Hart | H04W 72/0453 |
| | | | | 370/329 |
| 2015/0009871 | A1 | 1/2015 | Shousterman | |
| 2016/0285505 | A1* | 9/2016 | Lee | H04L 5/14 |
| 2016/0295519 | A1* | 10/2016 | Hultell | H04W 52/14 |
| 2019/0053115 | A1* | 2/2019 | Ngai | H04W 36/14 |
| 2019/0069302 | A1 | 2/2019 | Kumar et al. | |
| 2019/0081657 | A1* | 3/2019 | Zeng | H04W 72/0453 |
| 2019/0082337 | A1 | 3/2019 | Gheorghiu et al. | |
| 2020/0119764 | A1* | 4/2020 | Zhou | H04W 72/1205 |
| 2020/0154496 | A1 | 5/2020 | Yi | |
| 2020/0170077 | A1* | 5/2020 | Lee | H04W 72/0453 |
| 2020/0205146 | A1* | 6/2020 | Takahashi | H04W 72/0413 |
| 2020/0235903 | A1* | 7/2020 | Kim | H04L 1/1812 |
| 2021/0092662 | A1* | 3/2021 | Takahashi | H04W 16/32 |

OTHER PUBLICATIONS

Huawei et al., Coexistence of NR DL and LTE, 3GPP TSG RAN WG1 Meeting #88, R1-1703559, Feb. 13-17, 2017, Athens, Greece.
Janne Peisa, 5G radio access for networked society, IEEE 5G Summit, Lisbon, Jan. 2017.
Catt, Discussion on coexistence of NR V2X and LTE V2X, R1-1901999, 3GPP TSG RAN WG1 Meeting #96, Athens, Greece, Feb. 16, 2019, section 4.1.
Huawei et al., Enhancements for single UL operation for EN-DC, R1-1906020, 3GPP TSG RAN WG1 Meeting #97, Reno, USA, May 4, 2019, section 2.
Apple Inc., Summary of offline discussions on remaining issues on potential enhancements to single Tx switched uplink for EN-DC, R1-1905862, 3GPP TSG RAN WG1 #96bis, Xi'an, China, Apr. 15, 2019, sections 3-11.
Nokia et al., Simultaneous connectivity handover with single uplink operation, R2-1907273, 3GPP TSG-RAN WG2 Meeting #106, Reno, USA, May 2, 2019, sections 2-4.
International Search Report dated Aug. 25, 2020, issued in International Application No. PCT/KR2020/006504.
Extended European Search Report dated Jun. 7, 2022, issued in a counterpart European Application No. 20805785.1.
Huawei et al: "High priority scenarios for Rel-15 NR", 3GPP Draft; RP-171868, High Priority Scenarios for REL-15 NR, 3rd Generation Partnership Project (3GPP), Mobile Competence Centre ; 650, Route Des Lucioles ; F-06921 Sophia-Antipolis Cedex ; France vol. TSG RAN, No. XP051324434; Sep. 10, 2017, Sapporo, Japan.

* cited by examiner

METHOD AND APPARATUS FOR 5G MIGRATION IN FREQUENCY INTERFERENCE COMBINATION BAND

CROSS-REFERENCE TO RELATED APPLICATION(S)

This application is based on and claims priority under 35 U.S.C. § 119(e) of a U.S. provisional patent application Ser. No. 62/848,691, filed on May 16, 2019, in the U.S. Patent and Trademark Office, the disclosure of which is incorporated by reference herein in its entirety.

BACKGROUND

1. Field

The disclosure relates to a method and an apparatus for 5G migration in a frequency interference combination band. More particularly, the disclosure relates to a scheduling method and apparatus for interference control and efficient resource utilization in a mobile communication system supporting a carrier aggregation technology, a dual connectivity or multi-connectivity technology, or the like which simultaneously uses a plurality of frequency resources.

2. Description of Related Art

To meet the demand for wireless data traffic having increased since deployment of $4^{th}$ generation (4G) communication systems, efforts have been made to develop an improved $5^{th}$ generation (5G) or pre-5G communication system. Therefore, the 5G or pre-5G communication system is also called a "Beyond 4G Network" or a "Post LTE System". The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have also been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, machine type communication (MTC), and machine-to-machine (M2M) communication may be implemented by beamforming, MIMO, and array antennas. Application of a cloud radio access network (RAN) as the above-described big data processing technology may also be considered an example of convergence of the 5G technology with the IoT technology.

In case that a terminal transmits or receives a signal by using resources on different frequency bands from each other via carrier aggregation or dual or multi-connectivity, a terminal internal interference signal due to harmonic interference, inter-modulation distortion (IMD), and the like occurs at a specific frequency band reception end of the terminal, and thus the downlink signal receiving performance of the terminal may be deteriorated. Accordingly, a method for controlling such a terminal internal interference signal is needed.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method by which resources of different frequency bands from each other are scheduled to prevent harmonic interference, inter-modulation distortion, or the like from occurring therebetween, so as to prevent deterioration in the downlink reception performance of a terminal, and then a possible unused resource of each of the frequency bands is utilized, wherein efficiency of resource utilization is enhanced.

Additional aspects will be set forth in part in the description which follows and, in part, will be apparent from the description, or may be learned by practice of the presented embodiments.

In accordance with an aspect of the disclosure, a method performed by a base station in a communication system is provided. The method includes identifying whether a frequency band of a first cell and a frequency band of a second cell are a frequency combination in which inter-modulation distortion (IMD) interference or harmonic interference occurs, in case that the frequency band of the first cell and the frequency band of the second cell are a frequency combination in which IMD interference or harmonic interference occurs, identifying at least one resource configured as an unused resource, from among resources of the first cell and the second cell, identifying resource assignment information for at least one resource configured as the unused resource, transmitting or receiving a signal based on the resource assignment information.

According to an embodiment, each of the first cell and the second cell are corresponds to at least one of a long term evolution (LTE) communication system and new radio (NR) communication system.

According to an embodiment, the frequency band of the second cell may be higher than the frequency band of the first cell.

According to an embodiment, in case that the frequency band of the first cell and the frequency band of the second cell are a frequency combination in which IMD interference occurs, at least a part of unused uplink (UL) resources of the first cell is configured as a supplementary uplink (SUL) resource of a third cell.

According to an embodiment, in case that the frequency band of the first cell and the frequency band of the second cell are a frequency combination in which IMD interference occurs, at least a part of unused downlink (DL) resources of the first cell is configured as a DL resource of the second cell, and at least a part of unused UL resources of the first cell is configured as a UL resource of the second cell.

According to an embodiment, in case that the frequency band of the first cell and the frequency band of the second cell are a frequency combination in which IMD interference and harmonic interference occur, at least a part of unused UL resources of the first cell is configured as a supplementary uplink (SUL) resource of a third cell, and at least a part of unused DL resources and UL resources of the second cell is configured as a DL resource and a UL resource of a fourth cell.

According to an embodiment, wherein, in case that the frequency band of the first cell and the frequency band of the second cell are a frequency combination in which harmonic interference occurs, at least a part of unused DL resources and UL resources of the second cell is configured as a DL resource and a UL resource of a fourth cell.

In accordance with another aspect of the disclosure, a method performed by a terminal in a communication system is provided. The method includes receiving configuration for a first cell a second cell, and in case that a frequency band of the first cell and a frequency band of the second cell are a frequency combination in which inter-modulation distortion (IMD) interference or harmonic interference occurs, transmitting or receiving a signal, based on resource assignment information for at least one resource configured as an unused resource, from among resources of the first cell and the second cell.

In accordance with another aspect of the disclosure, a base station in a communication system is provided. The base station includes a transceiver, and at least one processor configured to identify whether a frequency band of a first cell and a frequency band of a second cell are a frequency combination in which inter-modulation distortion (IMD) interference or harmonic interference occurs, in case that the frequency band of the first cell and the frequency band of the second cell are a frequency combination in which IMD interference or harmonic interference occurs, identify at least one resource configured as an unused resource, from among resources of the first cell and the second cell, identify resource assignment information for at least one resource configured as the unused resource, and transmit or receive a signal based on the resource assignment information.

In accordance with another aspect of the disclosure, a terminal in a communication system is provided. The terminal includes a transceiver, and at least one processor configured to receive configuration for a first cell a second cell, and in case that a frequency band of the first cell and a frequency band of the second cell are a frequency combination in which inter-modulation distortion (IMD) interference or harmonic interference occurs, transmitting or receiving a signal, based on resource assignment information for at least one resource configured as an unused resource, from among resources of the first cell and the second cell.

According to the disclosure, deterioration in the reception performance of a terminal caused by harmonic interference and inter-modulation distortion which may occur in a mobile communication system supporting a carrier aggregation technology, a dual connectivity/multi-connectivity technology, or the like which simultaneously uses a plurality of resources is prevented, and wasted resources are minimized at the time of such interference control, such that the transmission/reception performance of a terminal and a base station may be enhanced.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
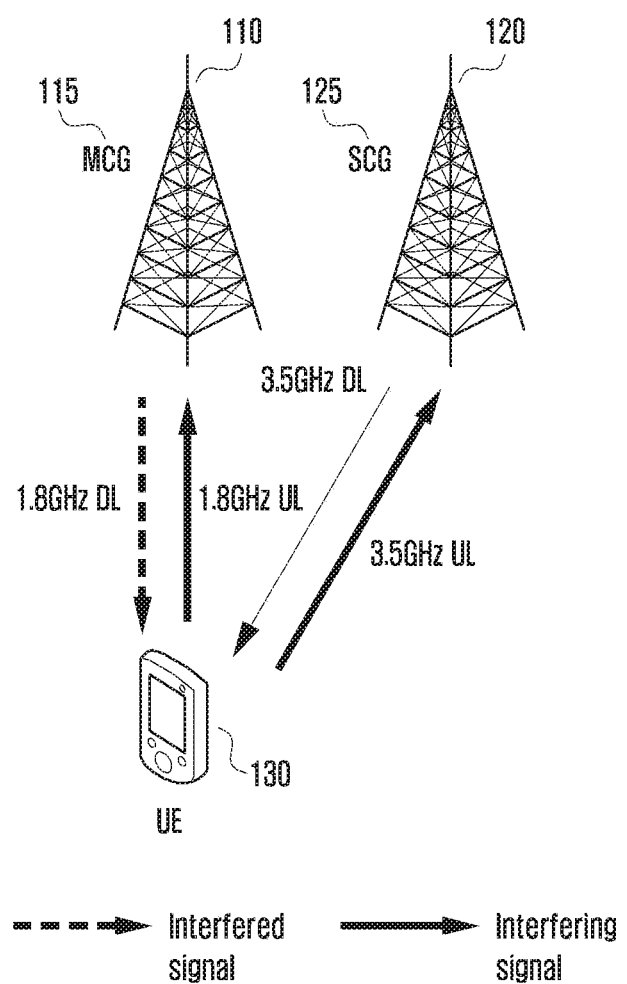
FIG. 1 illustrates a system in which inter-modulation distortion interference occurs according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Further, based on determinations by those skilled in the art, the particular embodiments of the disclosure may be applied to other communication systems with similar technical backgrounds and channel types through some modifications without significantly departing from the scope of the disclosure.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Here, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Further, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a Field Programmable Gate Array (FPGA) or an Application Specific Integrated Circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit", or divided into a larger number of elements, or a "unit". Moreover, the elements and "units" or may be implemented to reproduce one or more CPUs within a device or a security multimedia card.

The disclosure relates to a scheduling method for interference control in a mobile communication system supporting a carrier aggregation technology, a dual connectivity or multi-connectivity technology, or the like which simultaneously uses a plurality of frequency resources, and an apparatus for performing same.

A carrier aggregation (CA) technology is a technology of coupling a plurality of component carriers and enabling one terminal to simultaneously use the plurality of component carriers to transmit or receive a signal, so as to enhance frequency usage efficiency from the viewpoint of a terminal or a base station. Specifically, according to a CA technology, a terminal and a base station may transmit or receive a signal via a wideband by using a plurality of component carriers in each of an uplink (UL) and a downlink (DL), wherein each of the component carriers is positioned in different frequency bands from each other. Hereinafter, an uplink refers to a communication link through which a terminal transmits a signal to a base station, and a downlink refers to a communication link through which a base station transmits a signal to a terminal. At this time, the number of uplink component carriers and the number of downlink component carriers may be different from each other.

A dual connectivity or multi-connectivity technology is a technology of enabling one terminal to be connected to a plurality of different base stations from each other and to transmit or receive a signal by simultaneously using frequency resources which are in each of the plurality of base stations and are positioned in different frequency bands from each other, so as to enhance frequency usage efficiency from the viewpoint of a terminal or a base station. The terminal may be simultaneously connected to a first base station (as an example, the first base station may be a base station which provides a service by using a long term evolution (LTE) technology or a 4th generation mobile communication technology) and a second base station (as an example, the second base station may be a base station which provides a service by using a new radio (NR) technology or a 5th generation mobile communication technology), wherein frequency resources used by the base stations may be positioned in different bands from each other, respectively. In this case, the terminal may perform RRC access through the first base station and receive a serviced function (as an example, connectivity management, mobility management, or the like) provided in a control plane, and additional wireless resources for transmitting or receiving data through the second base station may be provided. At this time, in such a dual connectivity technology, dual connectivity in which a first base station uses an LTE communication system and a second base station uses dual connectivity using an NR communication system may be referred to as evolved universal terrestrial radio access (E-UTRA)-NR dual connectivity (EN-DC). A communication system to which the disclosure is applied is not limited to the EN-DC, and the disclosure may be applied to all of various types of multi-connectivity including a communication system (NE-DC: NR-E-UTRA dual connectivity) in which a first base station uses an NR technology and a second base station uses an LTE technology, a communication system in which a first base station and a second base station use an LTE technology, and a communication system in which a first base station and a second base station use an NR technology. In addition, the disclosure may be applied in case of carrier aggregation. Moreover, the disclosure may also be applied in case that a first system using a first communication technology and a second system using a second communication technology are implemented in one device or in case that a first base station and a second base station are positioned in the same geographic position, wherein the first communication technology and the second communication technology may be one of an LTE system and an NR system.

The carrier aggregation technology and the dual connectivity or multi-connectivity technology have various technical advantages, and thus various studies have been actively conducted in the academic world, the industrial world, and the like since the carrier aggregation technology and the dual connectivity or multi-connectivity technology were introduced by the 3GPP standard.

The carrier aggregation technology and the dual connectivity or multi-connectivity technology have similarities in that one terminal transmits or receives a signal by simultaneously using a plurality of frequency resources positioned in different frequency bands from each other. However, in case that one terminal transmits or receives a signal by simultaneously using a plurality of frequency resources positioned in different frequency bands from each other, an internal interference signal such as harmonic interference and inter-modulation distortion (IMD) may be caused to a specific frequency band reception end of the terminal according to frequency combination and terminal hardware and implementation characteristics, and thus the reception performance of the terminal may be deteriorated. Hereinafter, for convenience, a description will be made based on a system to which a dual connectivity technology is applied. However, the disclosure is not limited thereto, and the disclosure may also be applied to a system to which a carrier aggregation technology and a multi-connectivity technology are applied.

FIG. 1 illustrates a system in which IMD interference occurs according to an embodiment of the disclosure.

Referring to FIG. 1, inter-modulation distortion (IMD) may occur in a system composed of a plurality of base stations 110 and 120 which support one or more serving cells or cell groups, and a terminal 130 which transmits or receives a signal by simultaneously using a plurality of frequency resources positioned in different frequency bands from each other, the frequency bands being supported by the plurality of base stations. The plurality of base stations 110 and 120 may support serving cells or cell groups of different frequency bands from each other. FIG. 1 illustrates, as an example, a situation in which, from among the plurality of base stations 110 and 120, a first base station 110 supports a master cell group (MCG) 115, and a second base station 120 supports a secondary cell group (SCG) 125, but the disclosure is not limited thereto. In addition, hereinafter, it is disclosed as an example in the disclosure that an MCG supported by the first base station 110 is operated based on frequency division duplexing (FDD) and that an SCG supported by the second base station 120 is operated based on time division duplexing (TDD), but the disclosure is not limited thereto. Moreover, hereinafter, the disclosure will describe, as an example, EN-DC in which the first base station 110 controlling an MCG uses an LTE communication system, and the second base station 120 controlling an SCG uses an NR communication system. However, the disclosure is not limited thereto, and the disclosure may be applied to an arbitrary system composed of a terminal and base stations for operating different frequency bands from each other. In this case, a base station for operating a low frequency band from among different frequency bands from each other may correspond to the first base station 110, and a base station for operating a high frequency band may correspond to the second base station 120. Hereinafter, an LTE communication system and an NR communication system disclosed according to the description of EN-DC as an example may be understood as being replaced by an arbitrary communication system operated by the first base station 110 for operating a low frequency band and an arbitrary communication system operated by the second base station 120 for operating a high frequency band, respectively. In addition, the disclosure is not limited to a situation in which the first base station 110 and the second base station 120 are implemented as separate base stations, and the disclosure may be applied to a case where a plurality of cell groups of different frequency bands are operated by one base station.

As illustrated in FIG. 1, in case of a system in which transmission or reception of a signal between a plurality of base stations 110 and 120 and a terminal 130 is simultaneously performed in different frequency bands, due to intermodulation distortion caused by harmonic components of uplink signals of the different frequency bands from each other, the reception performance of receiving a downlink in a low frequency from a first base station 110 may be deteriorated.

Figure 2:
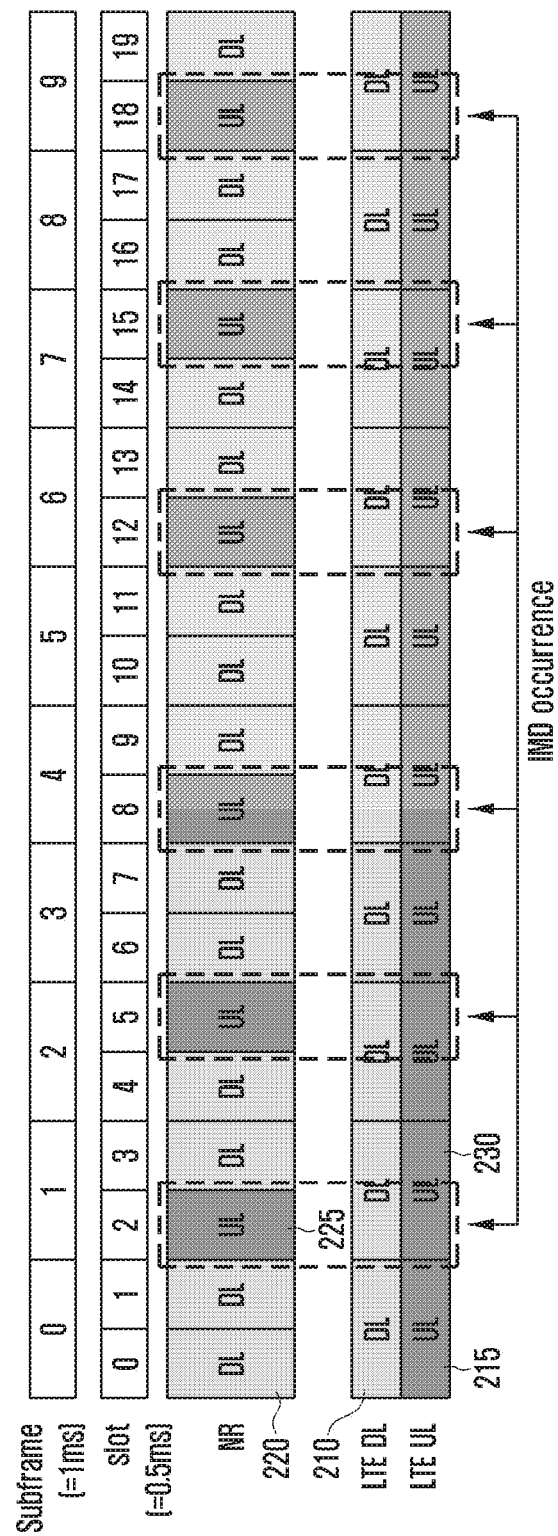
FIG. 2 illustrates wireless resources in which inter-modulation distortion (IMD) interference occurs in evolved universal terrestrial radio access (E-UTRA)-NR dual connectivity (EN-DC) according to an embodiment of the disclosure.

FIG. 2 illustrates wireless resources in which IMD interference occurs in EN-DC according to an embodiment of the disclosure.

Referring to FIG. 2, a terminal 130 may transmit or receive a downlink (DL) signal 210 and an uplink (UL) signal 215 in an LTE FDD-based MCG supported by a first base station 110, and may simultaneously transmit or receive a downlink (DL) signal 220 and an uplink (UL) signal 225 in an NR TDD-based SCG supported by a second base station 120. At this time, in case of a slot 230 in which the terminal 130 simultaneously performs LTE FDD UL transmission 215 to the first base station 110 and NR TDD UL transmission 225 to the second base station 120, the performance of LTE FDD DL reception 210 from the first base station 110 may be deteriorated due to IMD interference. Accordingly, a method for preventing deterioration in the DL reception performance of a terminal 130 due to such IMD interference is needed.

Figure 3:
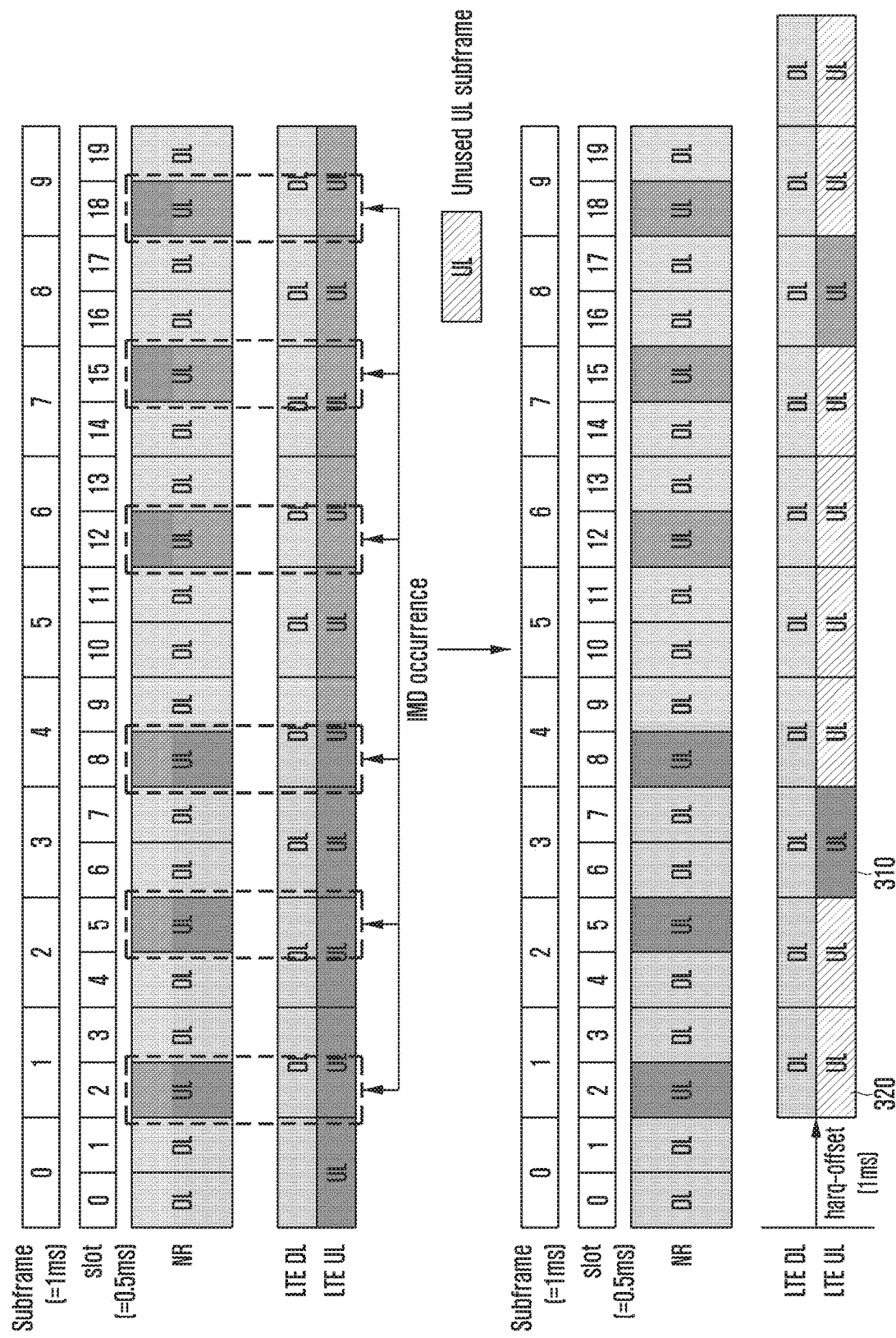
FIG. 3 illustrates a resource operation for IMD interference avoidance according to an embodiment of the disclosure.

FIG. 3 illustrates a resource operation for IMD interference avoidance according to an embodiment of the disclosure.

In the 3rd generation partnership project (3GPP) release 15 standard, a single uplink operation (SUO) technology was introduced as a solution using a base station operation for IMD interference occurring in EN-DC. An SUO is a technology of avoiding IMD interference with a time division multiplexing-based (TDM-based) scheduling control scheme. According to the SUO technology, a base station designates, by using uplink-downlink configuration (UL-DL configuration) and HARQ subframe offset which are applied to a LTE TDD system, a subframe 310 to which a terminal may transmit a UL signal in an LTE FDD system, such that one terminal simultaneously transmits an LTE frequency division duplexing (FDD) UL signal and an NR time division duplexing (TDD) UL signal to the same subframe so as not to cause IMD interference in an LTE FDD DL signal. A terminal may perform LTE FDD UL signal transmission only in a designated subframe, and thus IMD interference may be avoided by preventing NR UL and LTE UL signals from being simultaneously transmitted. However, in case of a method based on an SUO illustrated in FIG. 3, a terminal does not transmit a UL signal in a subframe 320 other than a designated LTE FDD UL subframe, and thus efficiency of resource utilization may be deteriorated.

Figure 4:
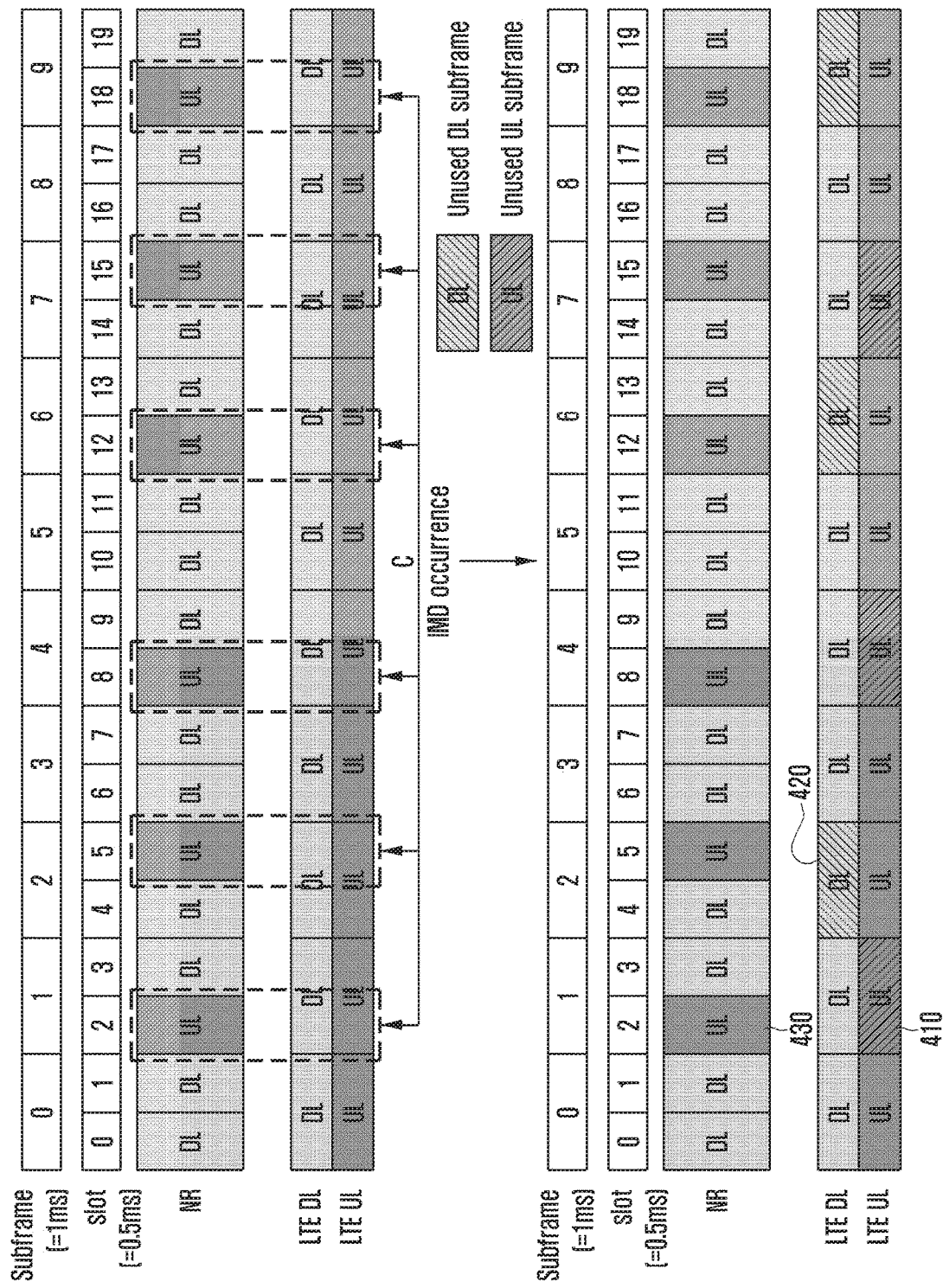
FIG. 4 illustrates a resource operation for IMD interference avoidance according to an embodiment of the disclosure.

FIG. 4 illustrates a resource operation for IMD interference avoidance according to an embodiment of the disclosure.

FIG. 4 illustrates a method for configuring, as an unused subframe, a part of uplink or downlink subframes in an LTE FDD system. Referring to FIG. 4, a base station or a scheduler may selectively configure, as an unused subframe, a subframe 410 and 420 overlapping an NR TDD UL slot 430 from among LTE FDD UL subframes or LTE FDD DL subframes. That is, a part of subframes 410 overlapping an NR TDD UL slot 430 from among the LTE FDD UL subframes may be configured as an unused subframe, or a part of subframes 420 overlapping the NR TDD UL slot 430 from among the LTE FDD DL subframes may be configured as an unused subframe. The position of an unused subframe illustrated in FIG. 4 is merely for exemplification and may be arbitrarily configured. Via such a method, NR TDD UL transmission and LTE FDD UL transmission are prevented from being simultaneously performed, or LTE FDD DL reception is prevented from being performed in a subframe in which NR TDD UL transmission and LTE FDD UL transmission are simultaneously performed, such that deterioration in LTE FDD DL reception performance may be prevented. However, identically in case of the method illustrated in FIG. 4, a terminal 110 does not use a part of LTE DL subframes and a part of LTE UL subframes, and thus efficiency of resource utilization may be deteriorated.

The disclosure proposes a method for enhancing efficiency of wireless resource utilization while preventing deterioration in the reception performance of a terminal due to IMD interference by using, as a supplementary uplink (SUL) carrier or as LTE-NR coexistence, an unused LTE subframe which may occur when a method for IMD interference avoidance is applied as in FIGS. 3 and 4.

Figure 5:
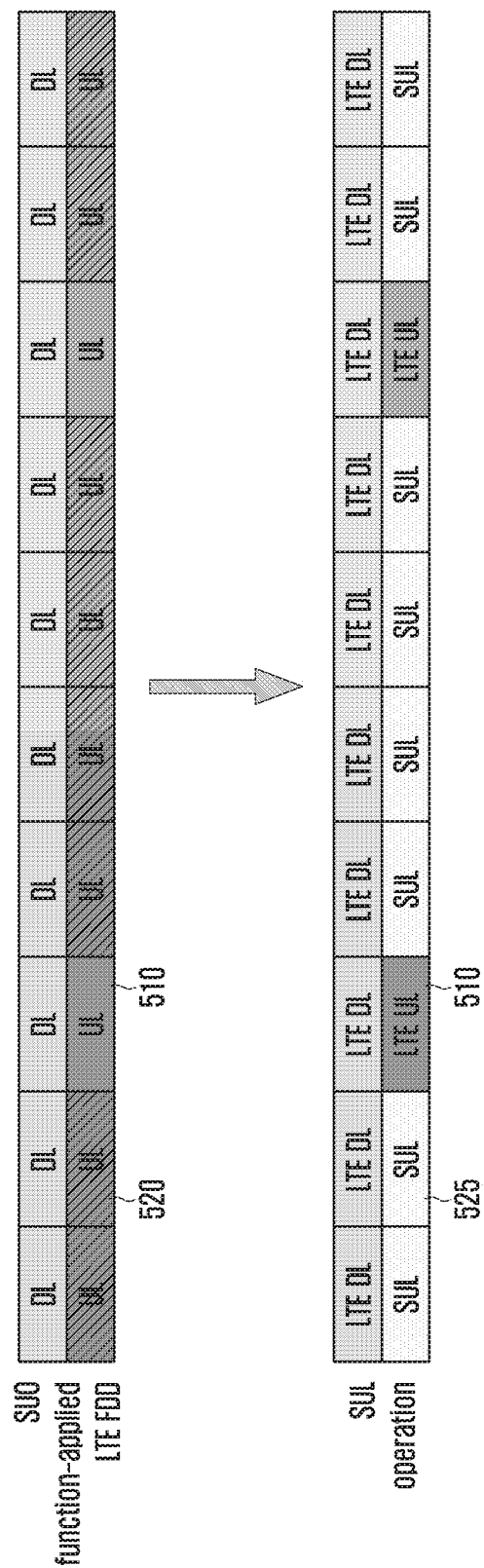
FIG. 5 illustrates a resource operation based on a supplementary uplink (SUL) according to an embodiment of the disclosure.

FIG. 5 illustrates a resource operation based on a supplementary uplink (SUL) according to an embodiment of the disclosure.

In a mobile communication system, service areas of an uplink and a downlink may not match due to differences in channel characteristics between the uplink and the downlink or differences in maximum transmission power, antenna structures, or the like between a terminal and a base station, and a downlink service area may be generally wider than an uplink service area. Accordingly, in order to support a wider uplink service area, a base station may utilize, as a supplementary uplink (SUL) band, a frequency band lower than a frequency band supported by the base station order. As an example, a 5G NR communication system usually uses a higher frequency band compared to an LTE communication system, and in this case, a base station for operating the 5G NR communication system may receive an uplink signal from a terminal by utilizing, as an SUL, a frequency band of the LTE communication system, which is a relatively low frequency band. A terminal 130 may receive configuration for both an NR uplink frequency and an SUL frequency. In this case, uplink transmission by the terminal 130 may be performed only in one of the NR uplink frequency and the SUL frequency at one time point.

In case of an SUO-based IMD avoidance method, LTE uplink transmission is allowed to be performed only in a part of LTE UL subframe 510 designated for a terminal such that an LTE FDD UL to a first base station 110 and an NR FDD UL to a second base station 120 do not simultaneously occur, and in this case, an undesignated subframe may correspond to an unused subframe 520. FIG. 5 shows a method for using such an unused LTE UL subframe 520 as an NR SUL subframe 525.

According to an embodiment, an unused LTE UL subframe 520 may be used as an SUL of an NR serving cell or an NR cell group other than an MCG 115 and an SCG 125 configured by a first base station 110 and a second base station 120, respectively. At this time, the SUL of the other NR serving cell or NR cell group may correspond to an SUL of an NR carrier, in which no IMD occurs, and the SCG 125 operated by the second base station 120.

According to the method illustrated in FIG. 5, LTE FDD UL signal transmission and NR TDD UL signal transmission are not allowed to be simultaneously performed, and a unused LTE UL subframe may be utilized as an SUL of an NR carrier in which IMD does not occur, so as to prevent the occurrence of IMD interference and minimize waste of wireless resources.

Figure 6:
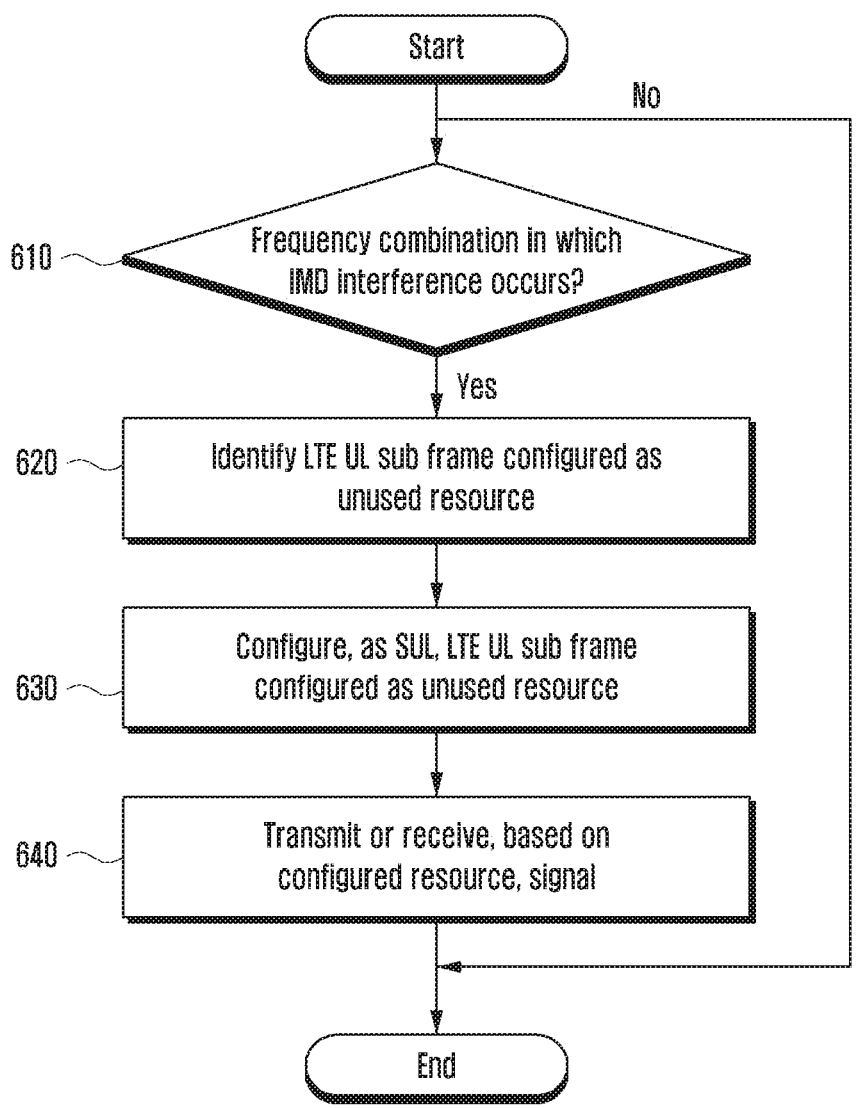
FIG. 6 is a flowchart illustrating a resource method of a base station, based on a supplementary uplink (SUL), according to an embodiment of the disclosure.

FIG. 6 is a flowchart showing a resource method of a base station, based on a supplementary uplink (SUL), according to an embodiment of the disclosure.

In operation 610, a base station may identify whether frequency bands of a first cell group and a second cell group configured for a terminal correspond to a frequency combination in which IMD interference may occur. In case of a frequency combination in which IMD interference does not occur (operation 610, No), a signal may be transmitted or received according to a general method without performing operations disclosed by the disclosure. In case of a frequency combination in which IMD interference occurs (operation 610, Yes), a base station may proceed to operation 620 to identify an LTE UL subframe configured as an unused resource. In operation 630, a base station may configure, as an SUL, an LTE UL subframe configured as an unused resource, and may transmit or receive, based thereon, a signal in operation 640. A method for configuring, as an SUL, an LTE UL subframe configured as an unused resource in operation 630 may follow the method described with reference to FIG. 5.

A part or all of respective steps illustrated in FIG. 6 may be performed by a first base station 110, a second base station 120, or an arbitrary operator not illustrated, according to implementation, and information produced as a result of operations may be transmitted to and shared with another base station or operator as necessary.

Figure 7A:
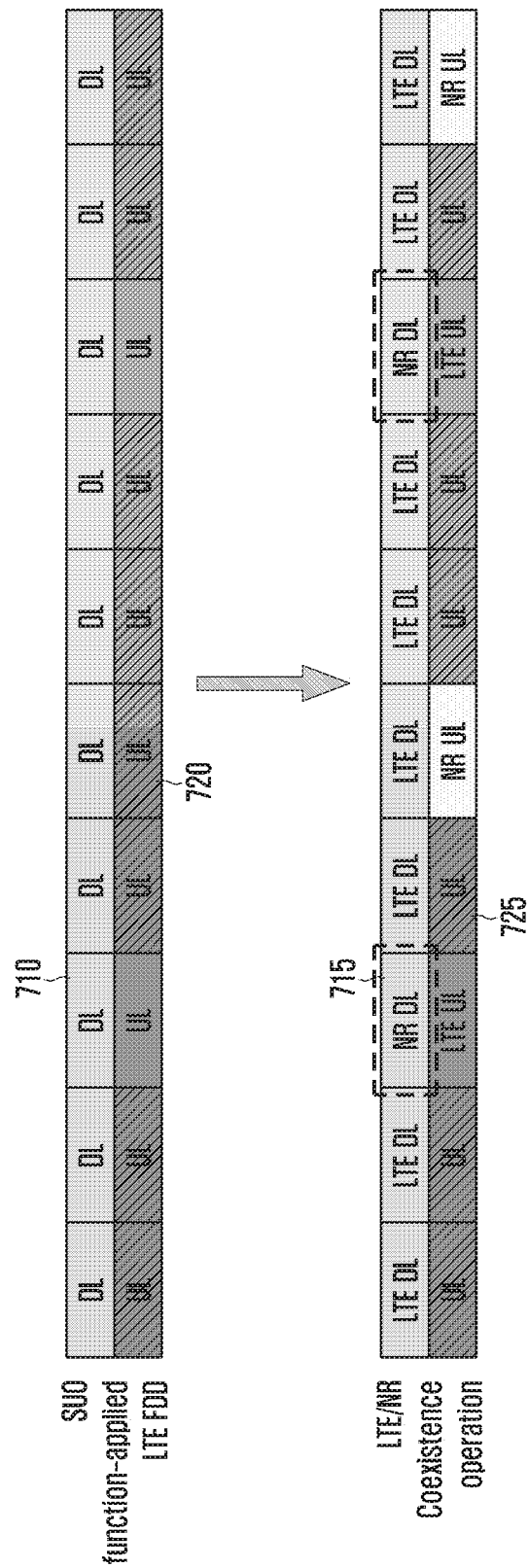
FIGS. 7A and 7B illustrate a resource operation based on LTE-NR coexistence illustrates according to various embodiments of the disclosure.
Figure 7B:
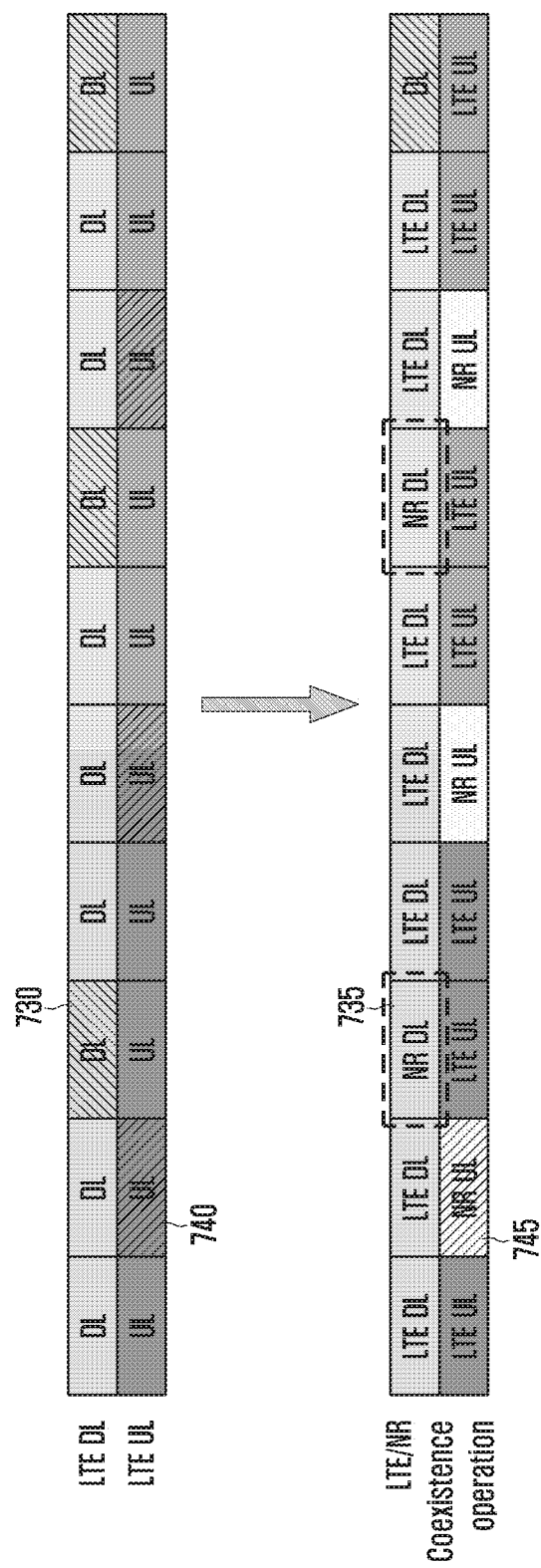

FIGS. 7A and 7B illustrate a resource operation based on LTE-NR coexistence illustrates according to various embodiments of the disclosure.

IMD interference which occurs as LTE UL transmission and NR UL transmission are simultaneously performed may affect the reception performance of an LTE DL operated in a low frequency band. Accordingly, such deterioration in the reception performance of an LTE DL may be prevented by using a part of LTE DL subframes as an NR DL resource which is less affected by IMD interference.

FIG. 7A illustrates a method for operating an LTE FDD resource as LTE-NR coexistence in the SUO-based IMD interference avoidance method described based on FIG. 3. Referring to FIG. 7A, a second base station 120 for operating an NR communication system may operate an LTE band as LTE-NR coexistence by using a part of LTE FDD DL subframes 710 as a resource for an NR DL 715 and using a part of LTE FDD UL subframes 720 as a resource for an NR UL 725. According to an embodiment, an LTE DL subframe 710 used as a resource for an NR DL 715 may be determined based on MBSFN configuration. According to MBSFN configuration configured for a terminal 130, a part of LTE subframe may be configured as an MBSFN subframe, and at this time, a second base station 120 may use, as a resource for NR DL 715, a part of subframes configured as MBSFN subframes.

Figure 7C:
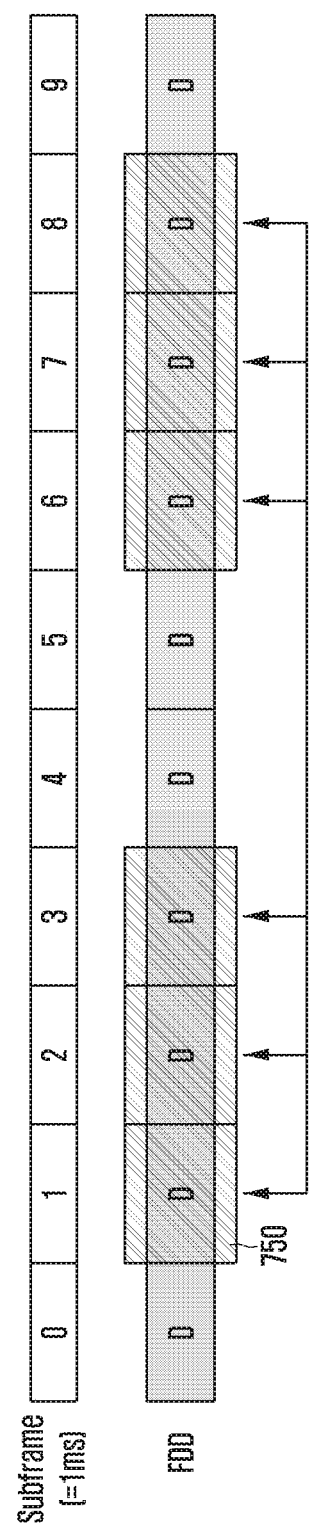
FIG. 7C illustrates MBSFN subframe configuration according to an embodiment of the disclosure.

FIG. 7C illustrates MBSFN subframe configuration according to an embodiment of the disclosure.

FIG. 7C illustrates that subframe indexes #1, #2, #3, #6, #7, and #8 are configured as MBSFN subframes 750. However, this is merely for exemplification, and the disclosure is not limited thereto. Re-referring to FIG. 7A, a second base station 120 may use, as resources for an NR DL, subframes corresponding to subframe indexes #2 and #7 configured as MBSFN subframes from among LTE DL subframes. According to an embodiment, an LTE UL subframe 720 used as a resource for an NR UL 725 may be determined as an LTE UL subframe overlapping a slot for UL transmission on an NR SCG configured by a second base station 120. According to an embodiment, an NR UL resource 725 operated as LTE-NR coexistence in an LTE band may be used as a resource for transmitting an HARQ-ACK signal for a received signal to an NR DL resource operated as LTE-NR coexistence in the LTE band.

FIG. 7B illustrates a method for utilizing an LTE FDD resource as LTE-NR coexistence in the IMD interference avoidance method described based on FIG. 4. Referring to FIG. 7B, a second base station 120 for operating an NR communication system may operate an LTE band as LTE-NR coexistence by using a part of LTE FDD DL subframes 730 as a resource for an NR DL 735 and using a part of LTE FDD UL subframes 740 as a resource for an NR UL 745. According to an embodiment, in operating LTE-NR coexistence, an LTE DL subframe 730 used as a resource for an NR DL 735 and an LTE UL subframe 740 used as a resource for an NR UL 745 may be determined based on an LTE DL subframe configured as an unused subframe and an LTE UL subframe configured as an unused subframe, in describing FIG. 4. FIG. 4 proposed a method for configuring, as an unused subframe, a part of LTE FDD DL subframes and LTE FDD UL subframes so as to prevent NR TDD UL transmission and LTE FDD UL transmission from being simultaneously performed or prevent LTE FDD DL reception from being performed in a subframe in which NR TDD UL transmission and LTE FDD UL transmission are simultaneously performed, and in the disclosure, a part of LTE DL and LTE UL subframes configured as an unused subframe may be used as an NR DL or NR UL resource based on LTE-NR coexistence. According to an embodiment, an NR UL resource operated as LTE-NR coexistence in an LTE band may be used as a resource for transmitting an HARQ-ACK signal for a received signal to an NR DL resource operated as LTE-NR coexistence in the LTE band.

Figure 8:
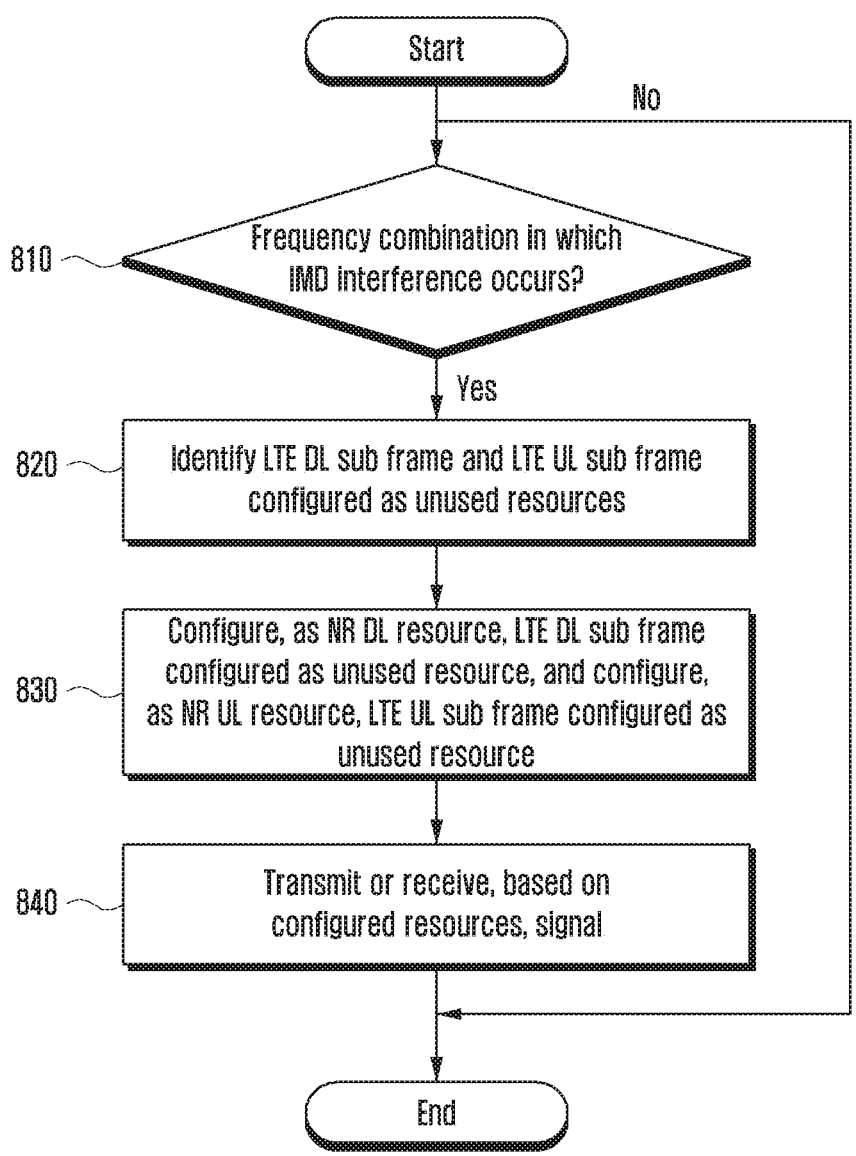
FIG. 8 is a flowchart illustrating a resource method of a base station, based on NR-LTE coexistence, according to an embodiment of the disclosure.

FIG. 8 is a flowchart illustrating a resource method of a base station, based on NR-LTE coexistence, according to an embodiment of the disclosure.

Referring to FIG. 8, in operation 810, a base station may identify whether frequency bands of a first cell group and a second cell group configured for a terminal correspond to a frequency combination in which IMD interference may occur. In case of a frequency combination in which IMD interference does not occur (operation 810, No), separate interference control is not required, and thus a signal may be transmitted or received according to a general method without performing operations disclosed by the disclosure. In case of a frequency combination in which IMD interference occurs (operation 810, Yes), a base station may proceed to operation 820 to identify an LTE DL subframe and an LTE UL subframe configured as unused resources. In operation 830, a base station may configure, as an NR DL resource, an LTE DL subframe configured as an unused resource, may configure an LTE UL subframe as an NR UL resource, and may transmit or receive, based thereon, a signal in operation 840. A method for configuring, as an NR DL resource and an NR UL resource, an LTE DL subframe and an LTE UL subframe configured as unused resources in operation 830 may follow the methods described with reference to FIGS. 7A to 7C.

A part or all of respective steps illustrated in FIG. 8 may be performed by a first base station 110, a second base station 120, or an arbitrary operator not illustrated, according to implementation, and information produced as a result of operations may be transmitted to and shared with another base station or operator as necessary.

A scheduling method for efficiency use of resources and interference control in a situation wherein IMD interference exists has been described, and hereinafter, a scheduling method in a situation where harmonic interference (HI) exists will be described.

Figure 9:
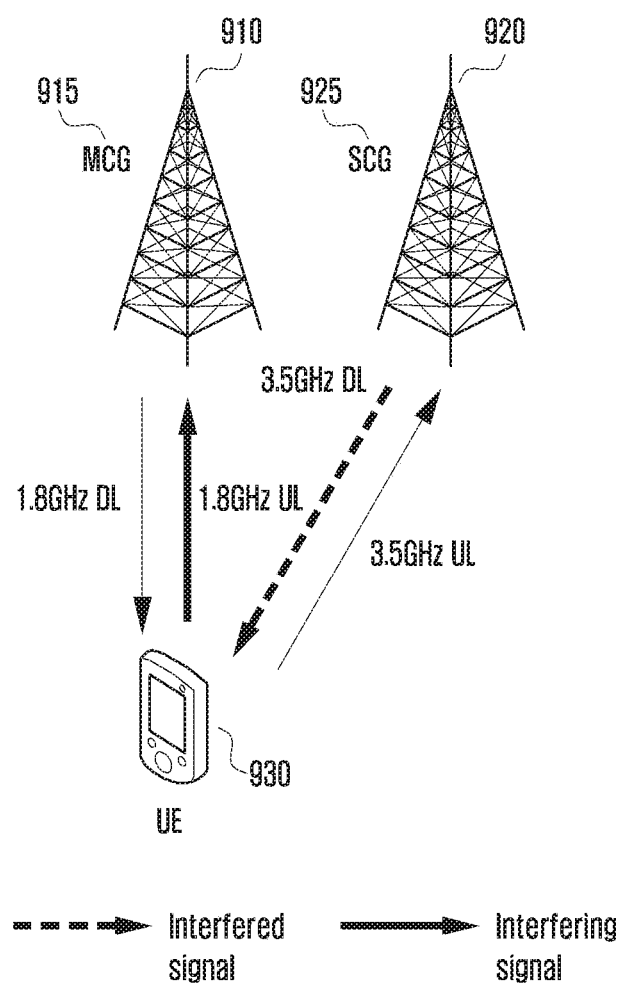
FIG. 9 illustrates a system in which harmonic interference (HI) occurs according to an embodiment of the disclosure.

FIG. 9 illustrates a system in which harmonic interference (HI) occurs according to an embodiment of the disclosure.

Referring to FIG. 9, harmonic interference (HI) may occur in a system composed of a plurality of base stations 910 and 920 which support one or more serving cells or cell groups, and a terminal 930 which transmits or receives a signal by simultaneously using a plurality of frequency resources positioned in different frequency bands from each other, the frequency bands being supported by the plurality of base stations. The plurality of base stations 910 and 920 may support serving cells or cell groups of different frequency bands from each other. FIG. 9 illustrates, as an example, a situation in which, from among the plurality of base stations 910 and 920, the first base station 910 supports a master cell group (MCG) 915, and the second base station 920 supports a secondary cell group (SCG) 925, but the disclosure is not limited thereto. In addition, hereinafter, it is disclosed as an example in the disclosure that an MCG is operated based on frequency division duplexing (FDD) and that an SCG is operated based on time division duplexing (TDD), but the disclosure is not limited thereto. Moreover, hereinafter, the disclosure will describe, as an example, EN-DC in which the first base station 910 controlling an MCG uses an LTE communication system, and the second base station 920 controlling an SCG uses an NR communication system. However, the disclosure is not limited thereto, and the disclosure may be applied to an arbitrary system composed of a terminal and base stations for operating different frequency bands from each other. In this case, a base station for operating a low frequency band from among different frequency bands from each other may correspond to the first base station 910, and a base station for operating a high frequency band may correspond to the second base station 920. Hereinafter, an LTE communication system and an NR communication system disclosed according to the description of EN-DC as an example may be understood as being replaced by an arbitrary communication system operated by the first base station 910 for operating a low frequency band and an arbitrary communication system operated by the second base station 920 for operating a high frequency band, respectively. In addition, the disclosure is not limited to a situation in which the first base station 910 and the second base station 920 are implemented as separate base stations, and the disclosure may be applied to a case where a plurality of cell groups of different frequency bands are operated by one base station. In case of such a system in which transmission or reception of a signal is simultaneously performed in different frequency bands from each other, the reception performance of a DL signal in a high frequency band may be deteriorated due to a harmonic component of a UL signal of a low frequency band.

Figure 10:
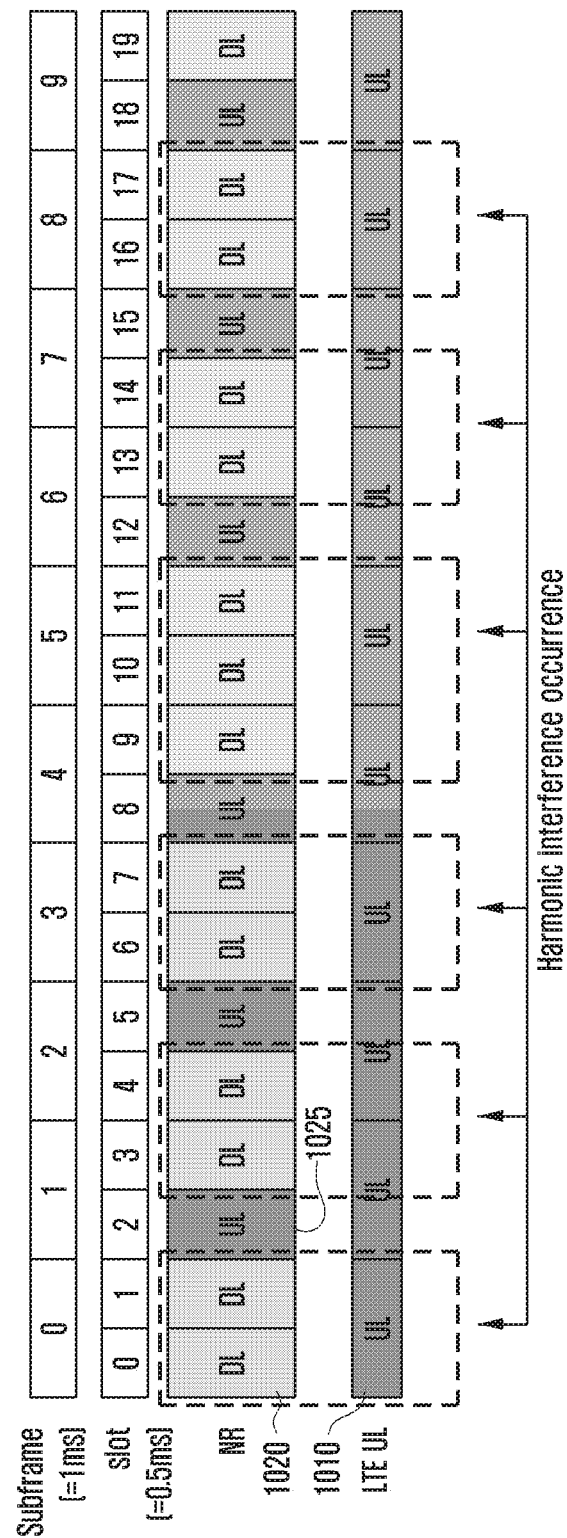
FIG. 10 illustrates wireless resources in which harmonic interference (HI) occurs in EN-DC according to an embodiment of the disclosure.

FIG. 10 illustrates wireless resources in which harmonic interference (HI) occurs in EN-DC according to an embodiment of the disclosure.

Referring to FIG. 10, a terminal 930 may transmit or receive an uplink (UL) signal 1010 in an LTE FDD-based MCG supported by a first base station 910, and may simultaneously transmit or receive a downlink (DL) signal 1020 and an uplink (UL) signal 1025 in an NR TDD-based SCG supported by a second base station 920. At this time, in case that the terminal 930 transmits an LTE FDD UL signal 1010 to the first base station 910 and simultaneously receives an NR DL signal 1020 from the second base station 120, the performance of receiving the NR DL signal 1020 from the second base station 920 may be deteriorated due to harmonic interference. Accordingly, a method for preventing deterioration in the DL reception performance of a terminal due to such harmonic interference is needed.

Figure 11:
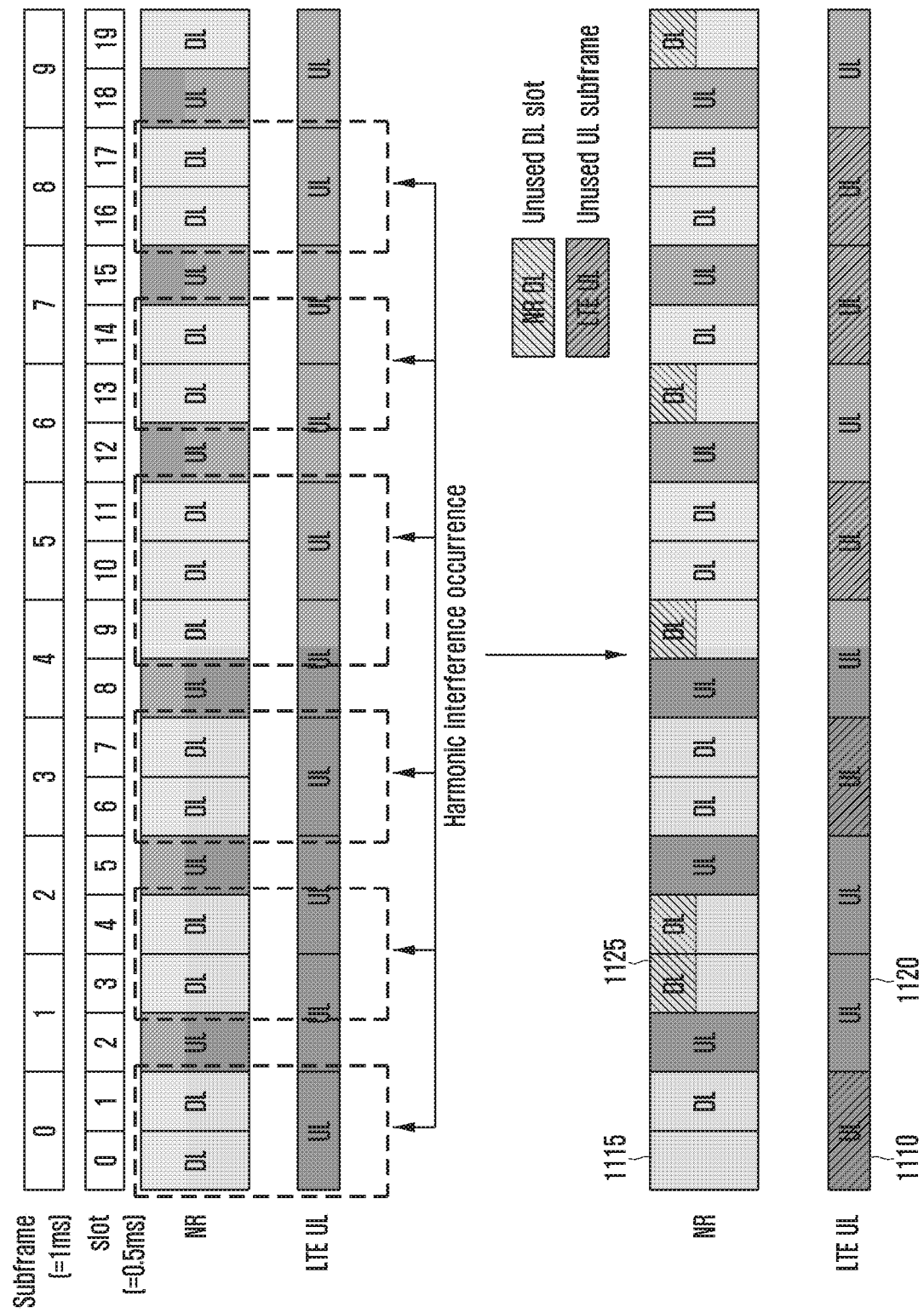
FIG. 11 illustrates a resource operation for harmonic interference avoidance according to an embodiment of the disclosure.

FIG. 11 illustrates a resource operation for harmonic interference avoidance according to an embodiment of the disclosure.

Referring to FIG. 11, a resource operation for harmonic interference avoidance in a situation (hereinafter, a partial LTE UL) in which, for IMD interference avoidance described above, a part of LTE UL subframe is configured as an unused subframe. That is, FIG. 11 shows an example of a resource operation for avoiding IMD interference and harmonic interference in case that both IMD interference and harmonic interference exist. Referring to FIG. 11, in case of an NR DL signal received in a slot 1115 corresponding to a part of LTE UL subframe (a subframe to which an LTE UL signal is not transmitted) 1110 which is configured as an unused subframe to avoid IMD interference from among NR DL signals, deterioration in reception performance due to harmonic interference may not occur. However, in case of an NR DL signal received in a slot 1125 corresponding to an LTE UL subframe (a subframe to which an LTE UL signal is transmitted) 1120 which is not configured as an unused subframe from among NR DL signals, deterioration in reception performance due to harmonic interference may occur. In this case, a second base station 920 may avoid harmonic interference by not using a part or all of frequency bands of an NR DL slot 1125 in which deterioration in reception performance occurs. However, in this case, since a part of LTE UL subframe 1110 is not used for IMD interference avoidance and a part or all of frequency bands of a part of NR DL slot 1125 is/are not used for harmonic interference avoidance, efficiency of resource utilization may be deteriorated.

Figure 12:
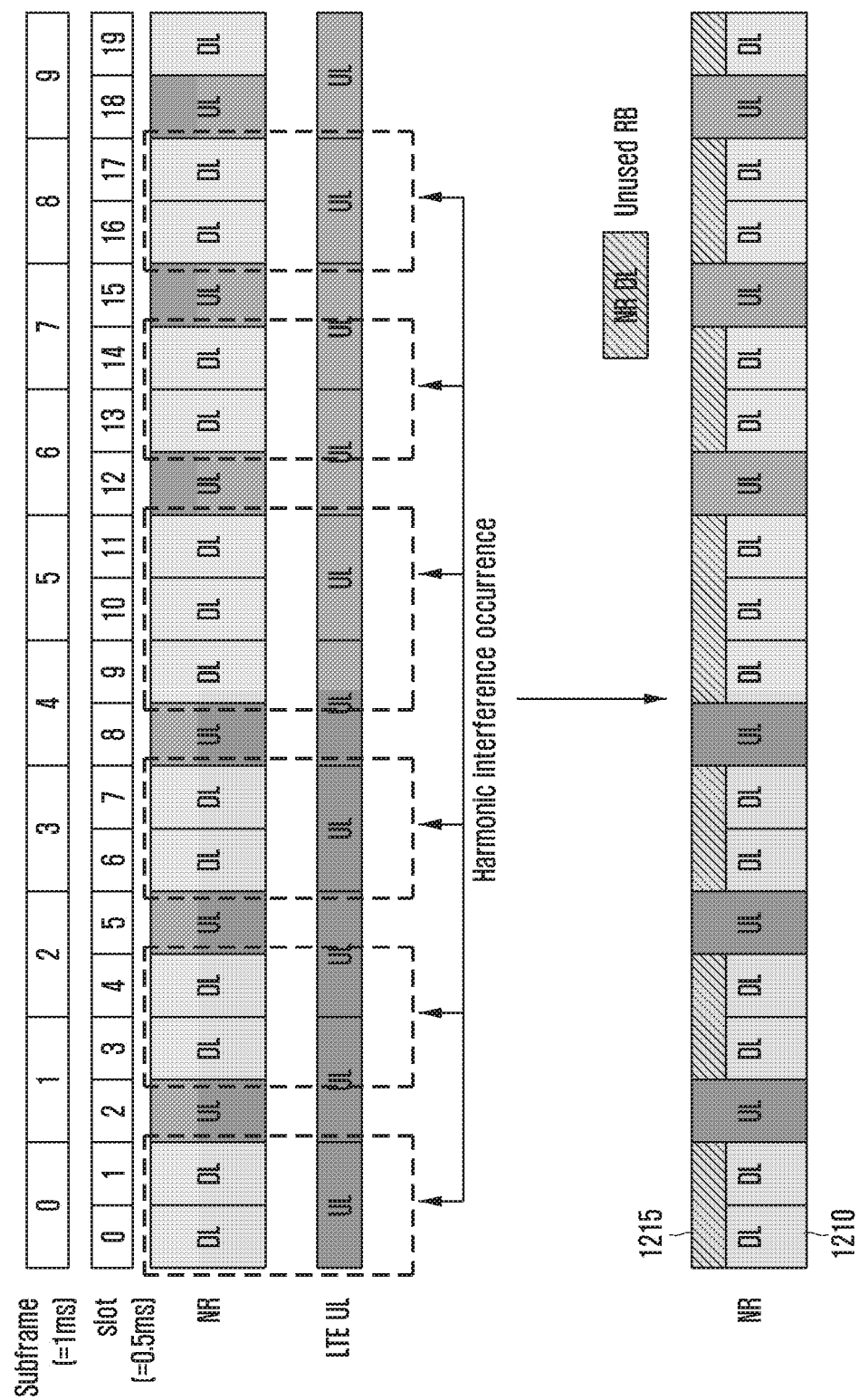
FIG. 12 illustrates a resource operation for harmonic interference avoidance according to an embodiment of the disclosure.

FIG. 12 illustrates a resource operation for harmonic interference avoidance according to an embodiment of the disclosure.

Referring to FIG. 12, a resource operation for harmonic interference avoidance in a situation in which IMD interference avoidance described above is not considered, that is, a situation (hereinafter, a full LTE UL) in which it is assumed that only harmonic interference exists. Likewise, in case that IMD interference avoidance is not considered, an LTE UL signal may be transmitted in all LTE UL subframes in contrast to the case described in FIG. 11, and thus deterioration in the reception performance due to harmonic interference may occur in all slots 1210 in which an NR DL signal is received. Accordingly, a second base station 920 may not use a part or all of frequency bands 1215 of an NR DL slot 1210 in which deterioration in reception performance occurs. In this case, since a part or all of NR DL slots is/are not used for harmonic interference avoidance, efficiency of resource utilization may be deteriorated.

The disclosure proposes a method for enhancing efficiency of wireless resource utilization while preventing deterioration in the reception performance of a terminal due to harmonic interference by using, as a resource for an NR SUL or a stand-alone (SA) NR cell, an unused LTE UL subframe or NR DL slot according to the harmonic interference avoidance methods described based on FIGS. 11 and 12.

Figure 13:
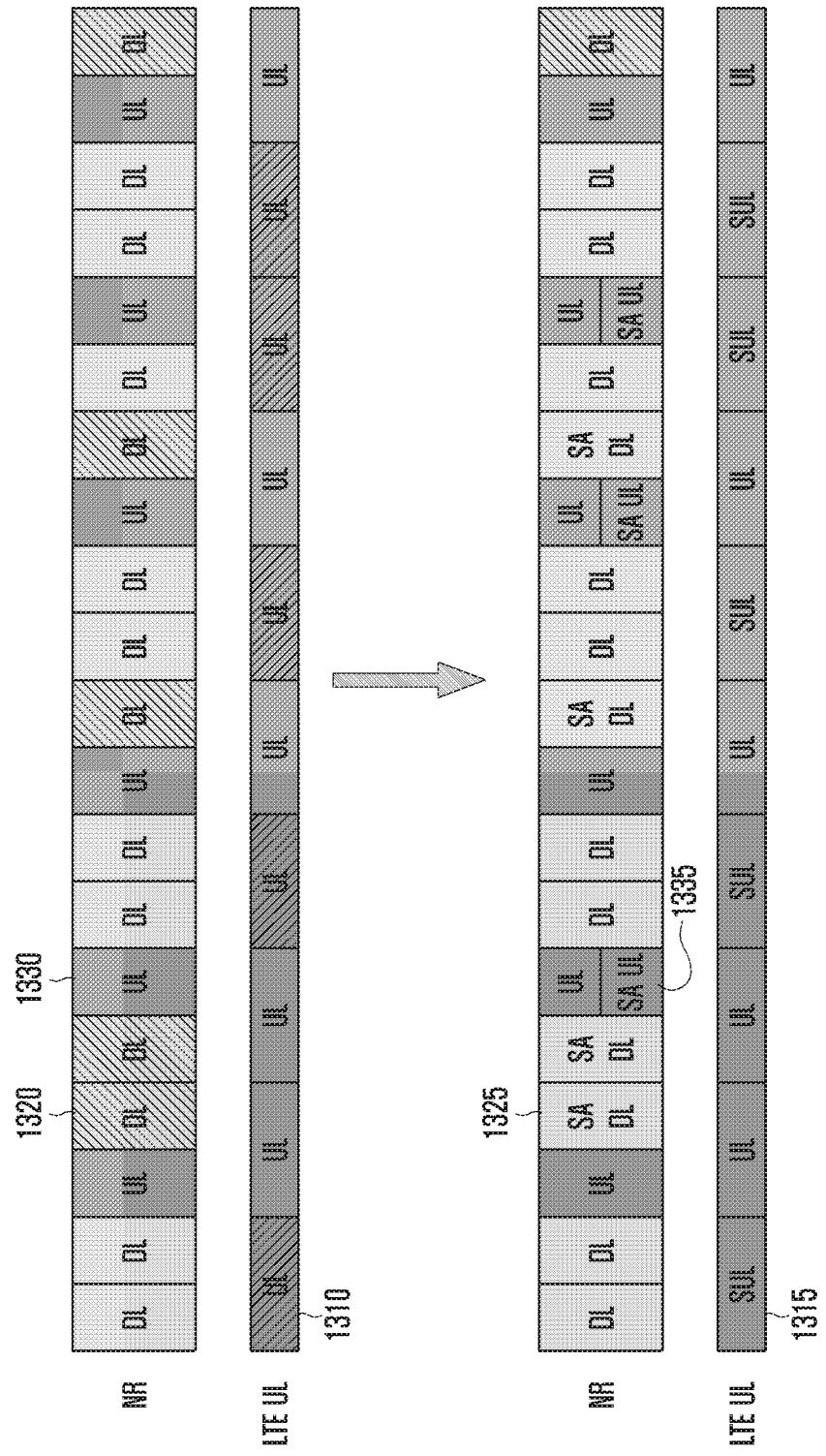
FIG. 13 illustrates a resource method in a partial LTE UL according to an embodiment of the disclosure.

FIG. 13 illustrates a resource method in a partial LTE UL according to an embodiment of the disclosure.

Referring FIG. 13, in a partial LTE UL situation in which both IMD interference and harmonic interference exist, a part of LTE UL subframe 1310 may be configured as an unused resource to avoid IMD interference, and a part or all of frequency bands of a part of NR DL slot 1320 may be configured as an unused resource to avoid harmonic interference. FIG. 13 shows a method in which, from among resources configured as unused resources, a part of unused LTE UL subframes 1310 is used as an NR SUL 1315 of an NR carrier in which harmonic interference does not occur, and a part of unused NR DL slots 1320 is used as a DL resource 1325 of a stand-alone (SA) NR cell group. The use of an LTE UL subframe as an NR SUL was described above with reference to FIG. 5, and thus a detailed description thereof will be omitted here. The IMD interference and harmonic interference described above occur by a frequency combination of an MCG 915 controlled by a first base station 910 and an SCG 925 controlled by a second base station 920 in a dual connectivity (DC) situation, and to avoid this, a part of unused NR DL slots 1320 may be configured as a DL slot (hereinafter, an SA DL slot) 1325 of an SA NR cell group rather than a DL slot of the SCG 925. FIG. 13 illustrates that all of unused DL slot frequency bands are used as SA DLs. However, as described above, only a part of NR DL slot frequency bands may be configured as an unused resource, and in this case, only a part of frequency bands of an unused DL slot may be used as an SA DL resource. According to an embodiment, a part or all of frequency bands of at least one of NR UL slots 1330 may be configured as an UL slot (hereinafter, an SA UL slot) 1335 of an SA NR cell group. Such an SA UL slot 1335 may be configured regardless of whether an NR UL resource is configured as an unused resource, and may be used to transmit an HARQ-ACK signal for a signal transmitted or received through the SA DL slot 1325.

Figure 14:
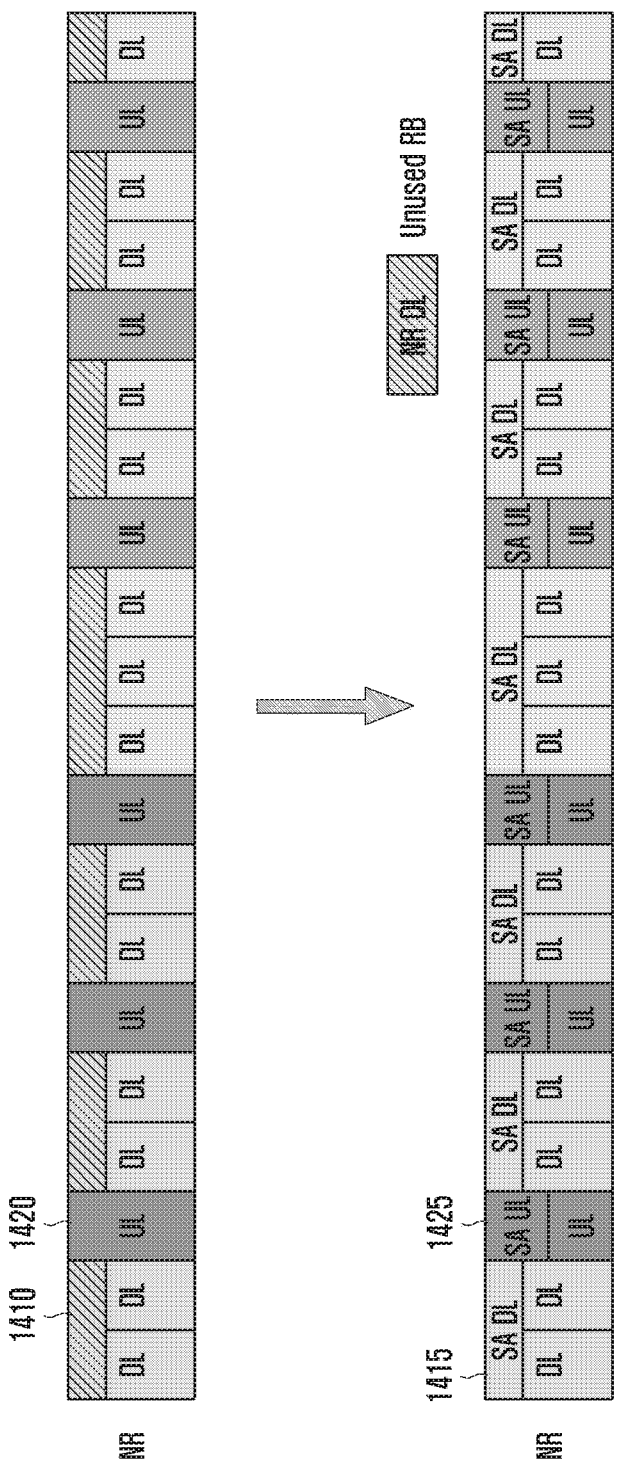
FIG. 14 illustrates a resource method in a full LTE UL according to an embodiment of the disclosure.

FIG. 14 illustrates a resource method in a full LTE UL according to an embodiment of the disclosure.

Referring to FIG. 14, in a full LTE UL situation in which IMD interference is not considered, a part or all of frequency bands of all NR DL slots may be configured as (an) unused resource(s) to avoid harmonic interference. FIG. 14 shows a method for using a part of unused NR DL slots 1410 as a DL resource 1415 of a stand-alone (SA) NR cell group. The IMD interference and harmonic interference described above occur by a frequency combination of an MCG 915 controlled by a first base station 910 and an SCG 925 controlled by a second base station 920 in a dual connectivity (DC) situation, and to avoid this, a part of unused NR DL slots 1410 may be configured as a DL slot (hereinafter, an SA DL slot) 1415 of an SA NR cell group rather than a DL slot of the SCG 925. As illustrated in FIG. 14, in case that only a part of NR DL slot 1410 frequency bands is configured as an unused resource, only a part of frequency bands of an unused DL slot 1410 may be used as an SA DL resource 1415. According to an embodiment, a part or all of frequency bands of at least one of NR UL slots 1420 may be configured as a UL slot (hereinafter, an SA UL slot) 1425 of an SA NR cell group. Such an SA UL slot 1425 may be configured regardless of whether an NR UL resource is configured as an unused resource, and may be used to transmit an HARQ-ACK signal for a signal transmitted or received through the SA DL slot.

Figure 15:
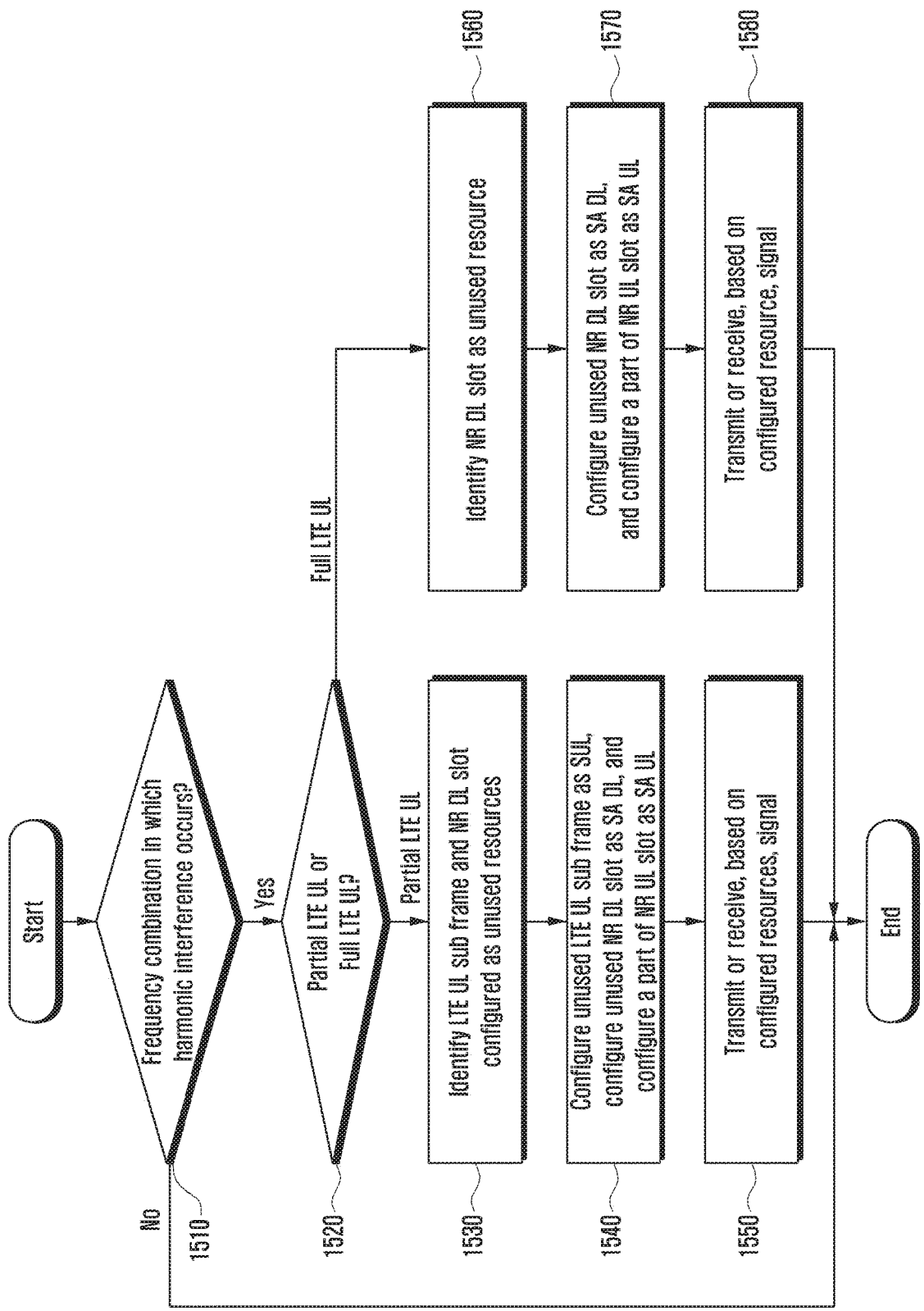
FIG. 15 is a flowchart illustrating a resource method of a base station for harmonic interference avoidance according to an embodiment of the disclosure.

FIG. 15 is a flowchart illustrating a resource method of a base station for harmonic interference avoidance according to an embodiment of the disclosure.

Referring to FIG. 15, in operation 1510, a base station may identify whether frequency bands of a first cell group and a second cell group configured for a terminal correspond to a frequency combination in which harmonic interference may occur. In case of a frequency combination in which harmonic interference does not occur (operation 1510, No), a signal may be transmitted or received according to a general method without performing operations disclosed by the disclosure. In case of a frequency combination in which harmonic interference occurs (operation 1510, Yes), a base station may proceed to operation 1520 to identify whether an LTE UL resource corresponding to a first cell group is a partial LTE UL or a full LTE UL. At this time, a partial LTE UL may represent a situation in which a part of LTE UL subframes is configured as an unused resource as IMD interference exists, and a full LTE UL may represent a situation in which all LTE UL subframes are used regardless of IMD interference. In case that an LTE UL resource corresponding to a first cell group corresponds to a partial LTE UL (operation 1520, partial LTE UL), a base station may identify an LTE UL subframe and an NR DL slot configured as unused resources in operation 1530. In operation 1540, a base station may configure, as an SUL, an LTE UL subframe configured as an unused resource, may configure, as an SA DL, an NR DL slot configured as an unused resource, may configure, as an SA UL, a part of NR UL slot, and may transmit or receive, based thereon, a signal in operation 1550. In case that an LTE UL resource corresponding to a first cell group corresponds to a full LTE UL (operation 1520, full LTE UL), a base station may identify an NR DL slot configured as an unused resource in operation 1560. In operation 1570, a base station may configure, as an SA DL, an NR DL slot configured as an unused resource, may configure, as an SA UL, a part of NR UL slot, and may transmit or receive, based thereon, a signal in operation 1580.

A part or all of respective steps illustrated in FIG. 15 may be performed by a first base station 910, a second base station 920, or an arbitrary operator not illustrated, according to implementation, and information produced as a result of operations may be transmitted to and shared with another base station or operator as necessary.

Figure 16:
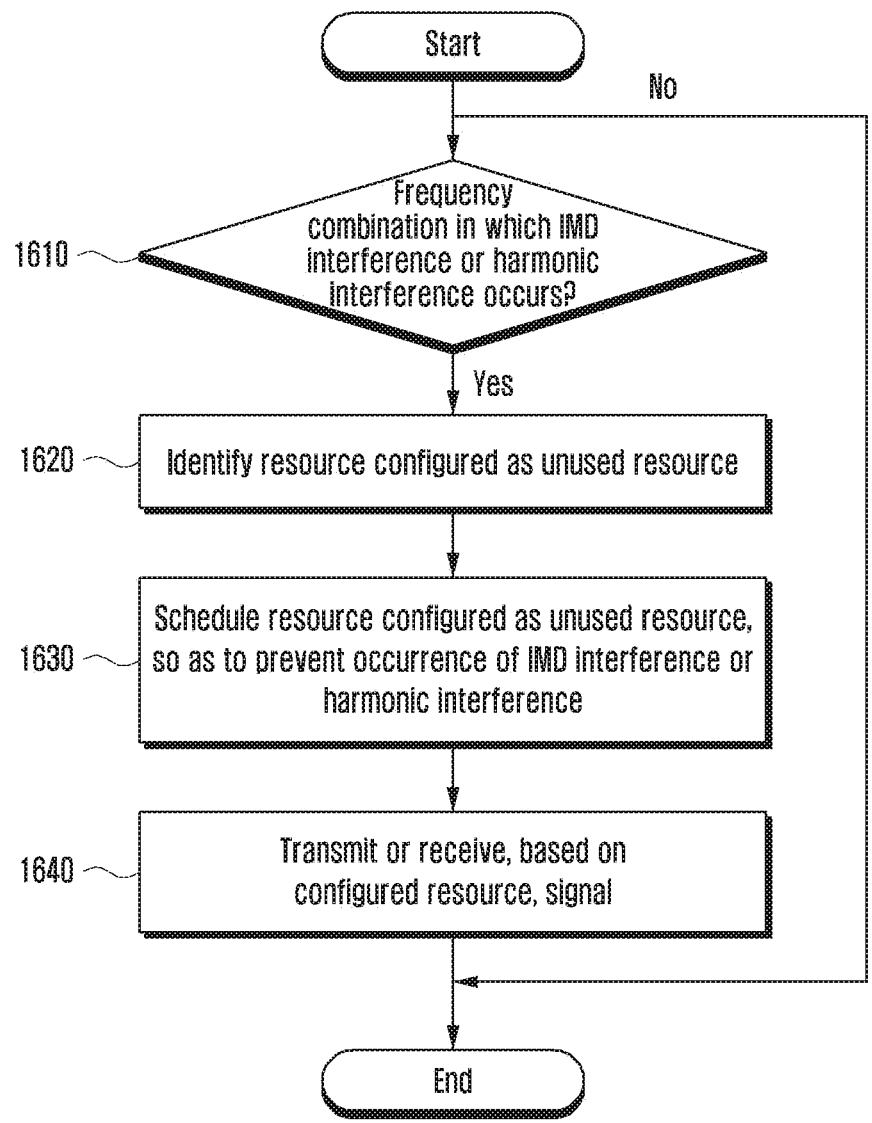
FIG. 16 is a flowchart illustrating an operation of a base station for IMD interference or harmonic interference avoidance according to an embodiment of the disclosure.

FIG. 16 is a flowchart illustrating an operation of a base station for IMD interference or harmonic interference avoidance according to an embodiment of the disclosure.

Referring to FIG. 16, in operation 1610, a base station may identify whether frequency bands of a first cell group and a second cell group configured for a terminal correspond to a frequency combination in which IMD interference or harmonic interference may occur. In case of a frequency combination in which IMD interference or harmonic interference does not occur (operation 1610, No), a signal may be transmitted or received according to a general method without performing operations disclosed by the disclosure. In contrast, in case that IMD interference or harmonic interference occurs (operation 1610, Yes), a base station may proceed to operation 1620 to identify a resource configured as an unused resource from among resources of a first cell group and a second cell group. In operation 1630, a base station may schedule a resource configured as an unused resource, so as to prevent the occurrence of IMD interference or harmonic interference, and may transmit or receive, based thereon, a signal in operation 1640. A specific method for preventing the occurrence of IMD interference or harmonic interference from a resource configured as an unused resource in operation 1630 may follow the methods described with reference to FIGS. 1 to 15.

A part or all of respective steps illustrated in FIG. 16 may be performed by a first base station 110 or 910, a second base station 120 or 920, or an arbitrary operator not illustrated, according to implementation, and information produced as a result of operations may be transmitted to and shared with another base station or operator as necessary.

Figure 17:
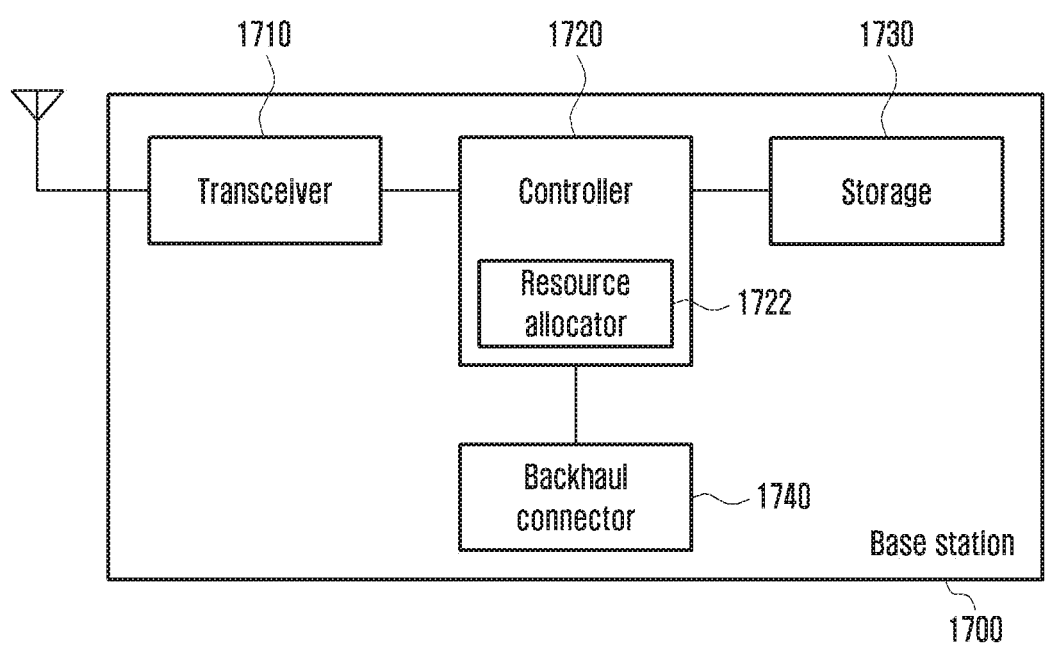
FIG. 17 is a block diagram illustrating a base station device according to an embodiment of the disclosure.

FIG. 17 is a block diagram illustrating a base station device which may carry out the disclosure according to an embodiment of the disclosure.

Referring to FIG. 17, a base station 1700 may include a transceiver 1710, a controller 1720, a storage 1730, and a backhaul connector 1740. The transceiver may transmit or receive a signal to or from a terminal. The signal may include control information and data. To this end, the transceiver 1710 may include an RF transmitter which up-converts and amplifies the frequency of a transmitted signal, an RF receiver which performs low-noise amplification on a received signal and down-converts the frequency thereof, and the like. In addition, the transceiver 1710 may receive a signal through a wireless channel and output the signal to the controller 1720, and may transmit, through a wireless channel, a signal output from the controller 1720. The backhaul connector 1740 may transmit or receive a signal to or from a core network and another base station which controls another cell group. The signal may include control information and data.

The controller 1720 controls the transceiver 1710 and the backhaul connector 1740 to carry out embodiments described in the disclosure.

Figure 18:
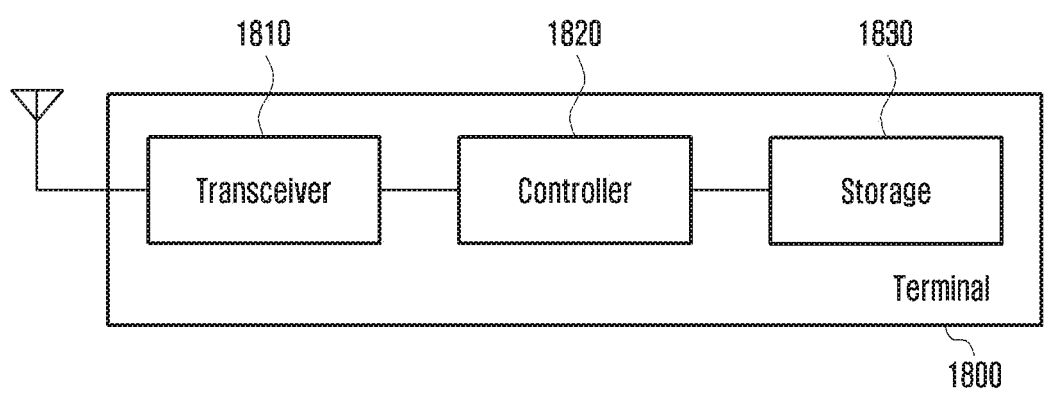
FIG. 18 is a block diagram illustrating a terminal device according to an embodiment of the disclosure.

FIG. 18 is a block diagram illustrating a terminal device which may carry out the disclosure according to an embodiment of the disclosure.

Referring to FIG. 18, a terminal 1800 may include a transceiver 1810, a controller 1820, and a storage 1830. The transceiver may transmit or receive a signal to or from a base station. The signal may include control information and data. To this end, the transceiver 1810 may include an RF transmitter which up-converts and amplifies the frequency of a transmitted signal, an RF receiver which performs low-noise amplification on a received signal and down-converts the frequency thereof, and the like. In addition, the transceiver 1810 may receive a signal through a wireless channel and output the signal to the controller 1820, and may transmit, through a wireless channel, a signal output from the controller 1820. The transceiver 1810 receives a resource allocation signal from a base station, and the resource allocation signal may be information indicating UL grant, DL allocation, and other signal transmission resources. The controller 1820 transmits or receives UL and DL signals according to the resource allocation signal.

According to the above-described embodiments, the reception performance of a terminal caused by harmonic interference and inter-modulation distortion which may occur in a mobile communication system supporting a carrier aggregation technology, a dual connectivity/multi-connectivity technology, or the like which simultaneously uses a plurality of frequency resources is prevented from being deteriorated, and wasted resources are minimized via interference control, such that the transmission/reception performance of a terminal and a base station may be enhanced.

Methods disclosed in the claims and/or methods according to various embodiments described in the specification of the disclosure may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of them may form a memory in which the program is stored. Further, a plurality of such memories may be included in the electronic device.

In addition, the programs may be stored in an attachable storage device which may access the electronic device through communication networks such as the Internet, Intranet, Local Area Network (LAN), Wide LAN (WLAN), and Storage Area Network (SAN) or a combination thereof. Such a storage device may access the electronic device via an external port. Further, a separate storage device on the communication network may access a portable electronic device.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

The embodiments of the disclosure described and shown in the specification and the drawings have been presented to easily explain the technical contents of the disclosure and help understanding of the disclosure, and are not intended to limit the scope of the disclosure. That is, it will be apparent to those skilled in the art that other modifications and changes may be made thereto on the basis of the technical spirit of the disclosure. Further, the above respective embodiments may be employed in combination, as necessary. For example, the embodiments of the disclosure may be partially combined to operate a base station and a terminal. Further, although the above embodiments have been described by way of the LTE/LTE-A system, other variants based on the technical idea of the embodiments may be implemented in other systems such as 5G and NR systems.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a first base station in a communication system, the method comprising:

identifying that a first frequency band associated with a first cell and a second frequency band associated with a second cell are a frequency combination in which inter-modulation distortion (IMD) interference or harmonic interference occurs;

identifying resource assignment information allocating resources for a terminal, wherein a resource not used by a first cell is allocated as a resource for a cell other than the first cell; and transmitting the resource assignment information to the terminal; and transmitting or receiving a signal based on the resource assignment information, wherein, in case that the first frequency band associated with the first cell and the second frequency band associated with the second cell are a frequency combination in which IMD interference occurs, a downlink (DL) resource not used by the first cell is allocated as a DL resource for the second cell, and an uplink (UL) resource not used by the first cell is allocated as an UL resource for the second cell.

2. The method of claim 1, wherein the first cell corresponds to long term evolution (LTE) and the second cell corresponds to new radio (NR).

3. The method of claim 1, wherein the second frequency band associated with the second cell is higher than the first frequency band associated with the first cell.

4. The method of claim 1, wherein, in case that the first frequency band associated with the first cell and the second frequency band associated with the second cell are a frequency combination in which IMD interference occurs, an uplink (UL) resource not used by the first cell is allocated as a supplementary uplink (SUL) resource of a third cell.

5. The method of claim 1, wherein, in case that the first frequency band associated with the first cell and the second frequency band associated with the second cell are a frequency combination in which IMD interference and harmonic interference occurs, an UL resource not used by the first cell is allocated as a supplementary uplink (SUL) resource of a third cell, and a DL resource and an UL resource not used by the second cell is allocated as a DL resource and a UL resource of a fourth cell.

6. The method of claim 1, wherein, in case that the first frequency band associated with the first cell and the second frequency band associated with the second cell are a frequency combination in which harmonic interference occurs, a DL resource and an UL resource not used by the second cell is allocated as a DL resource and a UL resource of a fourth cell.

7. A method performed by a terminal in a communication system, the method comprising:

receiving configuration for a first cell and a second cell, wherein a first frequency band associated with the first cell and a second frequency band associated with the second cell are a frequency combination in which inter-modulation distortion (IMD) interference or harmonic interference occurs;

receiving, from a first base station, resource assignment information allocating resource for the terminal, wherein a resource not used by a first cell is allocated as a resource for a cell other than the first cell; and transmitting or receiving a signal, based on resource assignment information, wherein, in case that the first frequency band associated with the first cell and the second frequency band associated with the second cell are a frequency combination in which IMD interference occurs, a downlink (DL) resource not used by the first cell is allocated as a DL resource for the second cell, and an uplink (UL) resource not used by the first cell is allocated as an UL resource for the second cell.

8. The method of claim 7, wherein the first cell corresponds to a long term evolution (LTE) and the second cell corresponds to new radio (NR).

9. The method of claim 7, wherein the second frequency band associated with the second cell is higher than the first frequency band associated with the first cell.

10. The method of claim 7, wherein, in case that the first frequency band associated with the first cell and the second frequency band associated with the second cell are a frequency combination in which IMD interference occurs, an uplink (UL) resource not used by the first cell is allocated as a supplementary uplink (SUL) resource of a third cell.

11. The method of claim 7, wherein, in case that the first frequency band associated with the first cell and the second frequency band associated with the second cell are a frequency combination in which IMD interference and harmonic interference occur, an UL resource not used by the first cell is allocated as a supplementary uplink (SUL) resource of a third cell, and a DL resource and an UL resource not used by the second cell is allocated as a DL resource and a UL resource of a fourth cell.

12. The method of claim 7, wherein, in case that the first frequency band associated with the first cell and the second frequency band associated with the second cell are a frequency combination in which harmonic interference occurs, a DL resource and an UL resource not used by the second cell is allocated as a DL resource and a UL resource of a fourth cell.

13. A first base station in a communication system, the first base station comprising:

a transceiver; and at least one processor configured to:

identify that a first frequency band associated with a first cell and a second frequency band associated with a second cell are a frequency combination in which inter-modulation distortion (IMD) interference or harmonic interference occurs, identify resource assignment information allocating resources for a terminal, wherein a resource not used by a first cell is allocated as a resource for a cell other than the first cell, transmit the resource assignment information to the terminal; and transmit or receive a signal based on the resource assignment information, wherein, in case that the first frequency band associated with the first cell and the second frequency band associated with the second cell are a frequency combination in which IMD interference occurs, a downlink (DL) resource not used by the first cell is allocated as a DL resource for the second cell, and an uplink (UL) resource not used by the first cell is allocated as an UL resource for the second cell wherein a resource of the identified unused resources of the first cell is used for a cell.

14. The first base station of claim 13, wherein the first cell corresponds to a long term evolution (LTE) and the second cell corresponds to new radio (NR), and wherein the second frequency band associated with the second cell is higher than the first frequency band associated with the first cell.

15. A terminal in a communication system, the terminal comprising:

a transceiver; and at least one processor configured to:

receive configuration for a first cell and a second cell, wherein a first frequency band associated with the first cell and a second frequency band associated with the second cell are a frequency combination in which inter-modulation distortion (IMD) interference or harmonic interference occurs, receive, from a first base station, resource assignment information allocating resource for the terminal, wherein a resource not used by a first cell is allocated as a resource for a cell other than the first cell, and transmit or receive a signal, based on resource assignment information, wherein, in case that the first frequency band associated with the first cell and the second frequency band associated with the second cell are a frequency combination in which IMD interference occurs, a downlink (DL) resource not used by the first cell is allocated as a DL resource for the second cell, and an uplink (UL) resource not used by the first cell is allocated as an UL resource for the second cell.

16. The terminal of claim 15, wherein the first cell corresponds to a long term evolution (LTE) and the second cell corresponds to new radio (NR), and wherein the second frequency band associated with the second cell is higher than the first frequency band associated with the first cell.

* * * * *